(12) United States Patent
Schön

(10) Patent No.: US 10,557,491 B2
(45) Date of Patent: Feb. 11, 2020

(54) FASTENING DEVICE FOR A FURNITURE PANEL

(71) Applicant: INTER IKEA SYSTEMS B.V., Delft (NL)

(72) Inventor: Daniel Schön, Kalvsvik (SE)

(73) Assignee: Inter IKEA Systems B.V., Delft (NL)

( * ) Notice: Subject to any disclaimer, the term of this patent is extended or adjusted under 35 U.S.C. 154(b) by 55 days.

(21) Appl. No.: 15/524,220

(22) PCT Filed: Jun. 17, 2015

(86) PCT No.: PCT/EP2015/063633
§ 371 (c)(1),
(2) Date: May 3, 2017

(87) PCT Pub. No.: WO2016/071008
PCT Pub. Date: May 12, 2016

(65) Prior Publication Data
US 2018/0017091 A1 Jan. 18, 2018

(30) Foreign Application Priority Data
Nov. 4, 2014 (SE) ...................................... 1451316

(51) Int. Cl.
*F16B 12/22* (2006.01)
*F16B 12/24* (2006.01)
(Continued)

(52) U.S. Cl.
CPC .............. *F16B 12/22* (2013.01); *F16B 12/24* (2013.01); *F16B 12/46* (2013.01); *A47B 2088/902* (2017.01)

(58) Field of Classification Search
CPC .......... F16B 12/22; F16B 12/24; F16B 12/46; F16B 12/20; A47B 2088/902;
(Continued)

(56) References Cited

U.S. PATENT DOCUMENTS 4,438,578 A * 3/1984 Logan ..................... F16B 12/24
40/782
4,493,583 A * 1/1985 Wallace ................... A47G 1/10
403/295

(Continued)

FOREIGN PATENT DOCUMENTS

AU 2005 200 644 A1 9/2005
CN 201160661 Y 12/2008
(Continued)

OTHER PUBLICATIONS

International Search Report PCT/EP2015/063633, dated Nov. 19, 2015.

*Primary Examiner* — Hiwot E Tefera
(74) *Attorney, Agent, or Firm* — Merchant & Gould P.C.

(57) ABSTRACT

The present invention relates to a fastening device for fastening to a furniture panel. The fastening device comprises at least two dowels for reception in furniture panel recesses. The dowels are each connected to lateral ends of lever arms. The lever arms are centrally connected to each other at a hinge joint. One dowel may be displaced in relation to the other dowel between a furniture panel fastening position and a furniture panel releasing position of the fastening device. A fastening system for joining furniture parts, comprising the fastening device, is also disclosed. A method for using the fastening system is described as well as furniture assemblies using the system.

14 Claims, 20 Drawing Sheets

(51) Int. Cl.
*F16B 12/46* (2006.01)
*A47B 88/90* (2017.01)

(58) Field of Classification Search
CPC .............. A47B 88/941; A47B 88/9412; A47B 88/9414; A47B 88/9416; A47B 88/9418; A47B 88/944; A47B 88/95; A47B 2088/951; A47B 2088/952; A47B 2088/939; A47B 2088/953; A47B 2088/954; A47B 2088/955; A47B 88/956; A47B 88/913; A47B 88/925; A47B 2230/11; A47B 2210/02; A47B 96/20; Y10T 403/557; Y10T 403/59; Y10T 403/595; Y10T 403/591; Y10T 403/46; Y10T 403/7015; Y10T 403/4602; Y10T 403/4694; Y10T 403/42
USPC ............ 312/348.1–348.4, 330.1, 263, 265.5, 312/265.6; 403/DIG. 11, DIG. 12, 403/DIG. 13
See application file for complete search history.

(56) References Cited

U.S. PATENT DOCUMENTS

| | | | | |
|---|---|---|---|---|
| 4,681,498 A | * | 7/1987 | Raffoni | ................ A47G 1/105 403/294 |
| 5,613,796 A | * | 3/1997 | Salice | ...................... E05D 5/08 403/409.1 |
| 5,895,103 A | * | 4/1999 | Huber | ................. A47B 88/956 312/348.4 |
| 6,257,796 B1 | * | 7/2001 | Salice | ................ F16B 12/2009 403/231 |
| 6,547,477 B1 | * | 4/2003 | Huber | ................ F16B 12/2009 403/231 |
| 2008/0164787 A1 | * | 7/2008 | Peng | ..................... A47B 43/00 312/108 |
| 2009/0284111 A1 | | 11/2009 | Hazzard et al. | |
| 2010/0242399 A1 | | 9/2010 | Sawyers et al. | |
| 2012/0133259 A1 | * | 5/2012 | Babucke-Runte | ... A47B 88/941 312/330.1 |
| 2015/0359334 A1 | * | 12/2015 | Salice | ..................... F16B 12/46 312/348.4 |
| 2018/0031019 A1 | * | 2/2018 | Sjostedt | ................ F16B 12/22 |

FOREIGN PATENT DOCUMENTS

| | | | |
|---|---|---|---|
| CN | 201806262 U | 4/2011 | |
| CN | 103025202 A | 4/2013 | |
| DE | 10 2010 036461 A1 | 1/2012 | |
| FR | 2 562 614 A1 | 10/1985 | |
| WO | WO 2009/046570 A1 | 4/2009 | |
| WO | WO-2012007371 A1 * | 1/2012 | .......... A47B 88/941 |
| WO | WO 2013/104422 A1 | 7/2013 | |

* cited by examiner

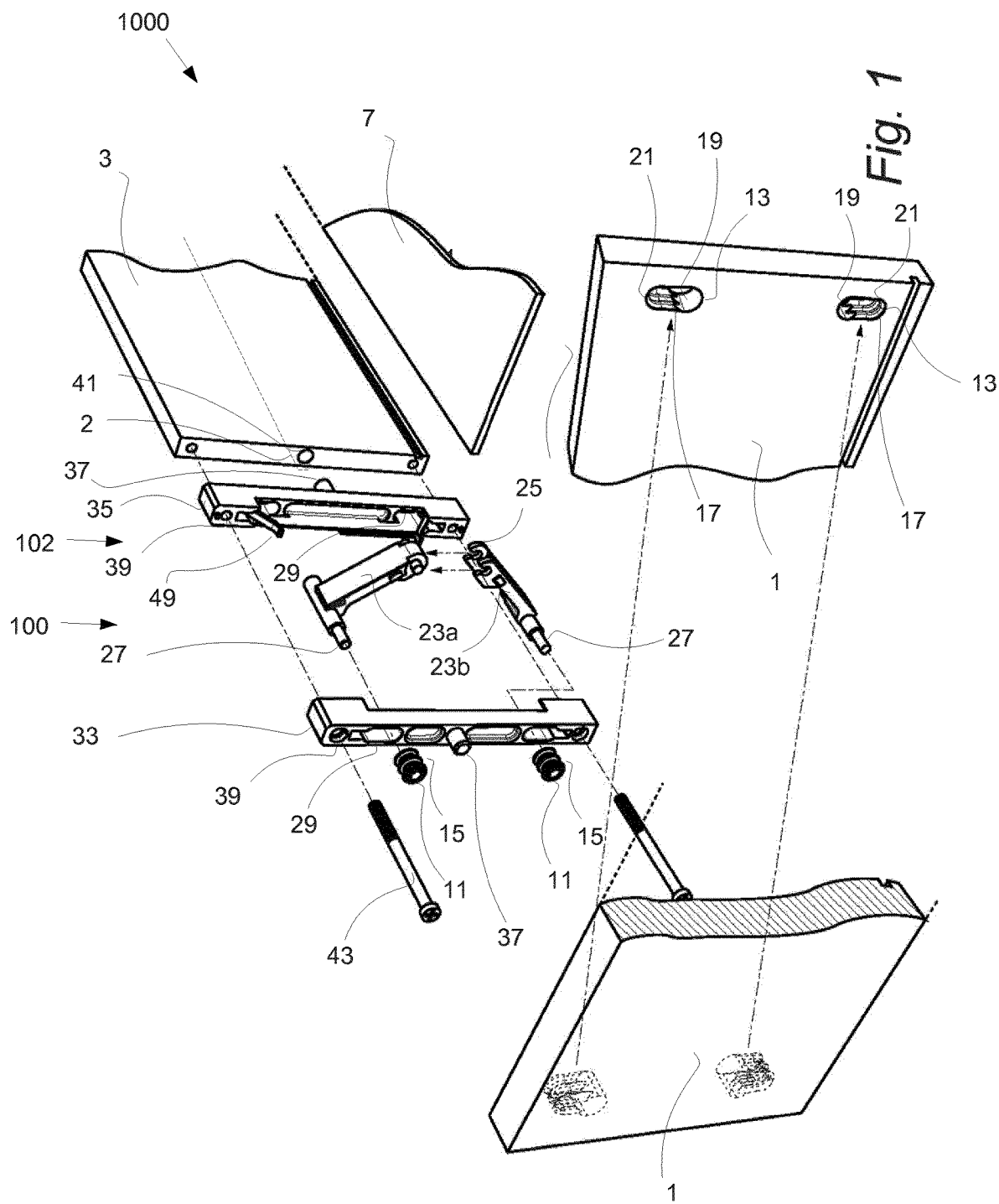

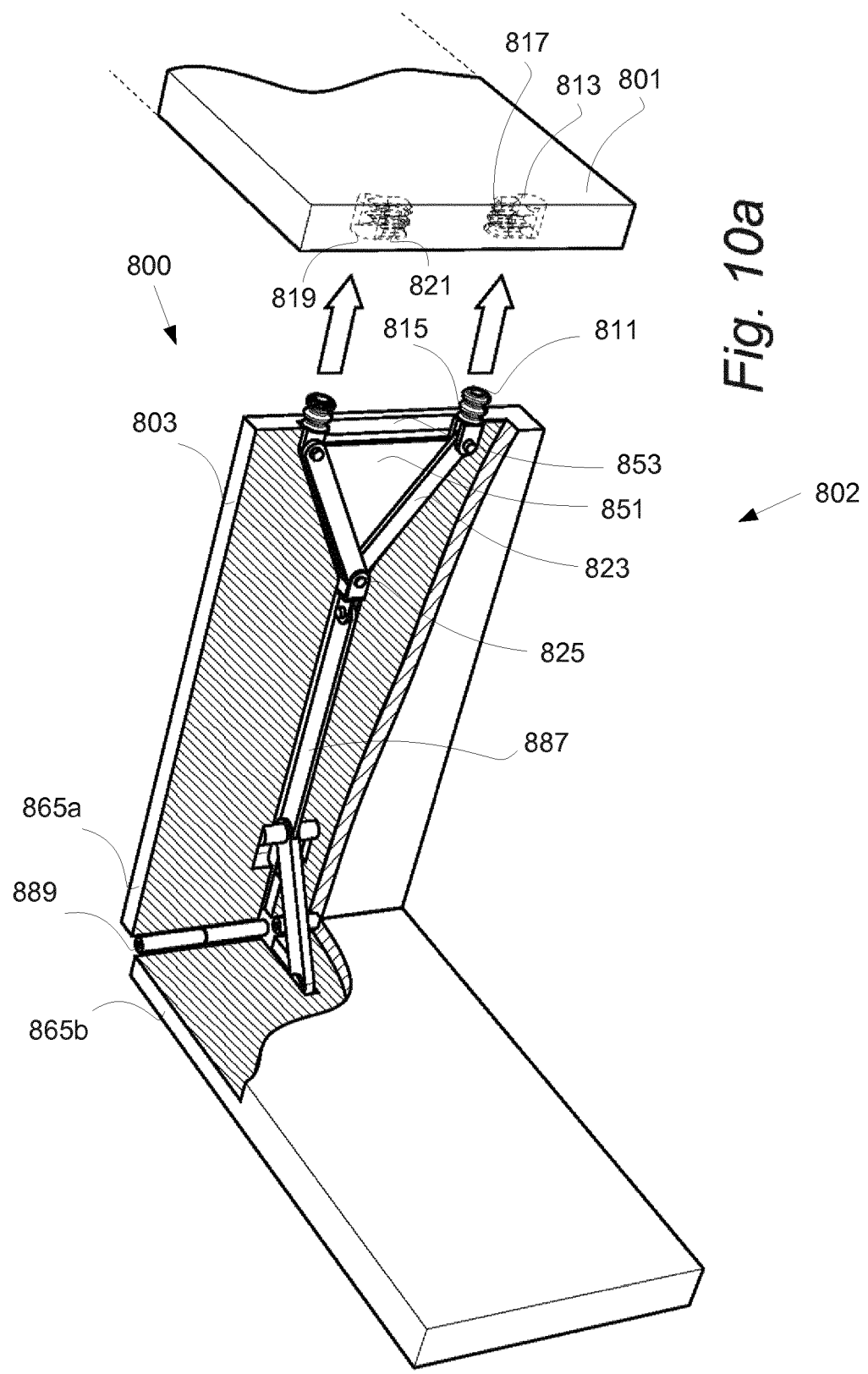

FASTENING DEVICE FOR A FURNITURE PANEL

This application is a National Stage Application of PCT/EP2015/063633 filed 17 Jun. 2015, which claims benefit of Swedish Patent Application No. 1451316-2, filed 4 Nov. 2014, which applications are incorporated herein by reference. To the extent appropriate, a claim of priority is made to each of the above disclosed applications.

FIELD OF THE INVENTION

The present invention relates to a fastening device for detachably assembling parts of furniture, especially for assembly of drawers. The fastening device, to be included in a first board, comprises at least two dowels, corresponding in size and position to at least two recesses in a second board to receive said dowels, such that said dowels may be received in said recesses.

BACKGROUND OF THE INVENTION

A drawer consists of two sides, a back, a front and a bottom. With the aim of making the drawer assembly as quick and easy as possible there is a need of especially a new front connector which assembles the front of the drawer to the drawer sides without moving them in relation to each other. Reasons include that the front has to be put straight onto the drawer due to the groove where the bottom shall fit and solutions where the drawer is folded together.

The requirements on such a front connector are that the front should be easy to assemble, have an assembly without relative movement of the parts and withstand a certain pulling force. These requirements need to be fulfilled by the front connector of which there today are several solutions for, none however that is optimized for all these parameters.

WO2013104422A1 describes a way to arrange joints for assembly of furniture parts to each other, using male and female part with grooves, however the presented solution does not include a fastening device which can assemble without relative movement of the furniture parts.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a fastening device for fastening to a furniture panel, wherein the fastening device comprises: at least two dowels for reception in furniture panel recesses, the dowels are each connected to lateral ends of lever arms, the lever arms are centrally connected to each other at a hinge joint, such that one dowel may be displaced in relation to the other dowel between a furniture panel fastening position and a furniture panel releasing position of the fastening device.

For this purpose, a fastening system for the joining of a first furniture part and a second furniture part for assembly of said furniture parts to each other, is also provided, said fastening system comprising a fastening device, wherein the fastening device is mounted on or integrated in the first furniture part, the second furniture part comprises at least two recesses of an oblong shape, the two recesses each comprises one insertion opening at one end and an inner end at the other end, the insertion openings of the recesses laterally facing towards or away from each other, the recesses comprising at least one groove which co-operates with at least one ridge on the dowels of the fastening device, where the at least one groove and the at least one ridge are both in the same plane, such that the dowels of the fastening device can be pushed into the recesses of the second furniture part when the fastening device is in releasing position, and the furniture parts are joined together when the fastening device is in fastening position, whereby the dowels are at the inner ends of corresponding the recesses, securely joining the furniture parts together.

Also, a fastening device for fastening a first furniture part to a second furniture part is provided, wherein the fastening device comprises at least two dowels for reception in recesses of the second furniture part. The dowels are each connected to a respective lever arm and the lever arms are connected to each other at a hinge joint, such that one dowel may be displaced in relation to the other dowel between a fastening position and a releasing position of the fastening device. The fastening device may be formed integrally as one piece. The lever arms may comprise a side flange extending in an axial direction of the dowels, and a support web. The side flange is perpendicular to the support web, the side flange and the support web extend across the hinge portion, and the at least two dowels extend from the support web. The support web is configured to be folded when the fastening device is in open configuration and is extending linearly when the fastening device is in closed configuration. The fastening device may comprise a locking member. The locking member is located on the side flange of the fastening device on the side facing the second furniture part. The locking member may be snap actuated and comprises a cantilever portion, a lip portion and a resilient base portion, wherein the base portion is positioned between the cantilever portion and the a lip portion thus acting as a fulcrum. The dowel of the fastening device may comprises a guide portion at the proximal end of the dowel contacting the support web.

Also, a fastening system for joining of a first furniture part and a second furniture part is provided. The fastening system comprises a fastening device, a first furniture part and a second furniture part. The first furniture part comprises a connecting slot and an L-flange perpendicular to the main plane of the first furniture part, comprising at least two holes. The second furniture part comprises at least two recesses of an oblong shape, the two recesses each comprises one insertion opening at one end and an inner end at the other end. The insertion openings of the recesses are laterally facing towards or away from each other. The recesses comprise at least one groove which co-operates with at least one ridge on the dowels of the fastening device. The at least one groove and the at least one ridge are both in the same plane, such that the dowels of the fastening device can be pushed into the recesses of the second furniture part when the fastening device is in releasing position. The arrangement of the two holes of the first furniture part corresponds to the arrangement of the at least two recesses of the second furniture part. This allows the L-flange of the first furniture part to be positioned on the second furniture part, such that the at least two holes overlap the at least two recesses. This allows the at least two dowels of the fastening device to be inserted trough the at least two holes into the at least two recesses, when the fastening device is in open configuration. When the inserted fastening device is brought to a closed position, the fastening device locks the first furniture part to the second furniture part by wedging the L-flange between the fastening device and second furniture part. In the fastening system, the locking member of the fastening device may snap into the connecting slot when it reaches closed configuration, reversibly locking the fastening device to the first furniture panel and in closed configuration. The fastening system guide portion may interact with the holes in the L-flange to steer the first and second furniture parts into a correct mounted position.

A method for using a fastening system is also provided, comprises the steps of aligning the fastening system of the first furniture part with corresponding recesses of the second furniture part, inserting the dowels into the insertion openings of the corresponding recesses, switching the fastening system from releasing position to fastening position, whereby the dowels are slid along the recesses, allowing for cooperation between the ridges of the dowels and the corresponding grooves of the recesses, until the dowels are at the inner end of the grooves of the recess, whereby the furniture parts are securely joined.

A furniture assembly, which contains at least one fastening system, and, a furniture assembly, wherein the furniture assembly is a drawer are also provided.

The general solution according to the invention is to provide a fastening device, using dowels with dowels and recesses with grooves, but which can be assembled without relative movement of the furniture parts.

Furthermore, the fastening device pulls the furniture parts together upon assembly, in one example using functional ridges positioned to pull the dowels backwards towards the device upon assembly.

BRIEF DESCRIPTION OF THE DRAWINGS

These and other aspects, features and advantages of which the invention is capable of will be apparent and elucidated from the following description of examples of the present invention, reference being made to the accompanying drawings, in which FIG. 1 is an exploded perspective view of part of a furniture assembly which includes a fastening device according to the present invention.

FIG. 10a is a schematic view of a furniture assembly which includes a fastening device according to another example of the present invention in attached and releasing position.

FIG. 15a is a schematic view of a fastening device and a first furniture part in attached and fastening position.

DESCRIPTION OF EMBODIMENTS

Figure 2A:
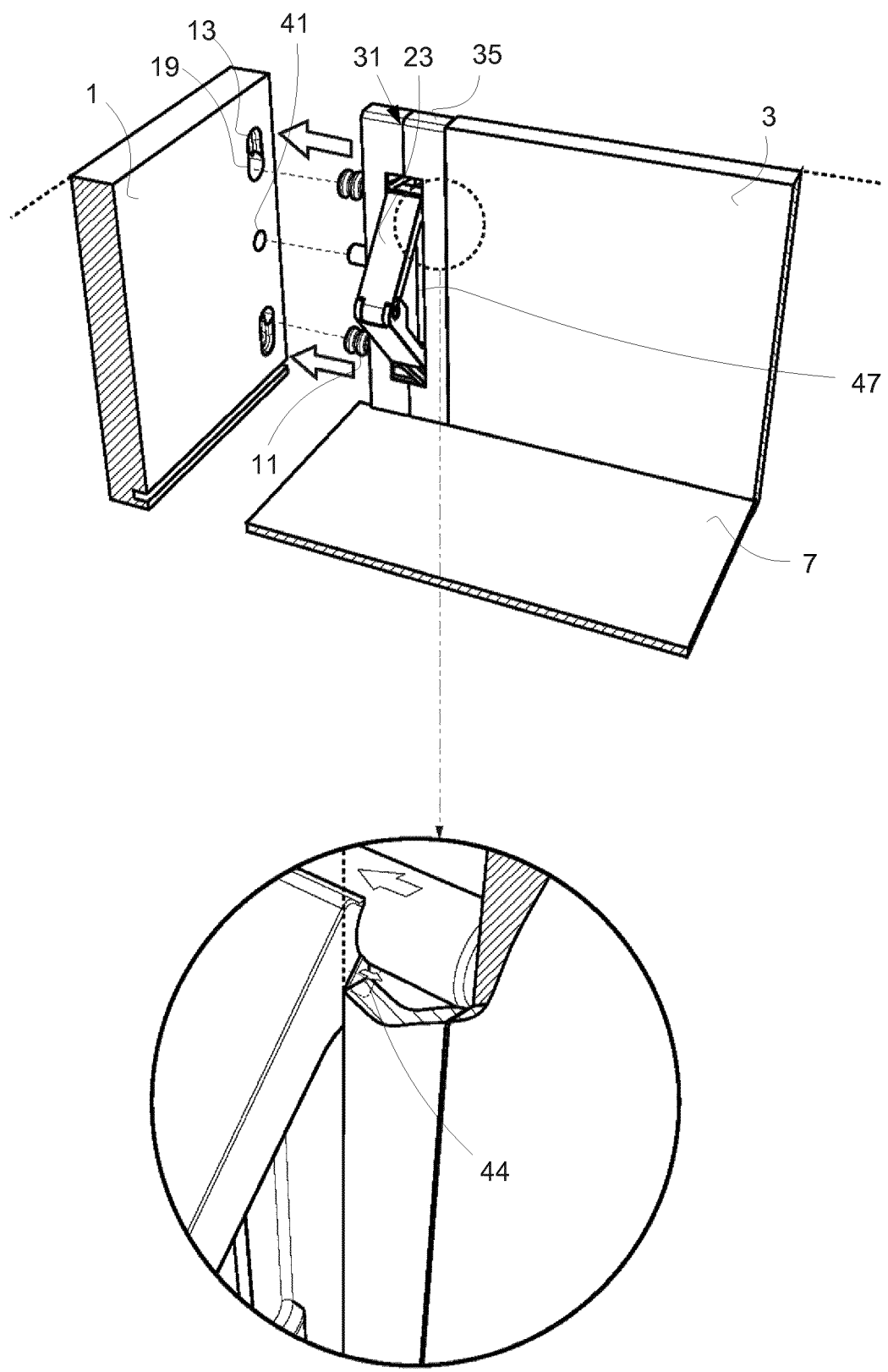
FIG. 2a is a perspective view of part of a furniture assembly which includes a fastening device according to the present invention in detached and releasing position and a detail view with a partial cutout.

The following description focuses on embodiments of the present invention applicable to a fastening device and in particular to a fastening device attaching two furniture parts to each other. However, it will be appreciated that the invention is not limited to this application but may be applied to many other joints between furniture parts, including furniture assemblies such as drawers, shelves and beds.

In an example of the invention according to FIGS. 1 to 3, a fastening system 100 is used in the assembly of a front panel 1, two side panels 3, a rear panel and a bottom panel 7 into a finished drawer. One fastening device 102 is attached to each side panel 3 as shown in FIGS. 1 to 3. Using Cartesian geometry, the dimensions can be labelled by x, y, z. The front and rear panels are of rectangular shape which extend along two parallel yz-planes, the side panels are of rectangular shape and extends in two parallel xy-planes and the bottom is of rectangular shape and extends in the xz-plane.

Axial movement is defined as movement along the longitudinal axis of the drawer side panel 3, which corresponds to movement along the x-axis and a normal axis of the front panel 1. A central point 2 is defined as the center of the side panel short edge 4, as can be seen in FIG. 1. Lateral movement is defined as movement towards or away from this central point 2, in the along the y-axis.

The fastening system 100, to be included in for example a side panel 3, uses two dowels 11 which connect to two recesses 13 in for example a front panel 1 to create the joint between the furniture parts. In FIGS. 1 to 3, the dowels 11 are positioned on the fastening system 100 on the side panel 3, extending along the x-axis of the drawer, and the corresponding recesses 13 are positioned on the front panel 1.

The dowels 11 have a number of ridges 15 which cooperate with a number of corresponding grooves 17 in the recesses 13. In FIGS. 2b, 2c, 3a and 3b one can see that the grooves 17 of the recesses 13 and the ridges 15 of the inserted dowels 11 are in the same plane, here the yz-plane of the drawer.

The recesses 13 have an insertion opening 19, respectively, in which the dowel 11 can be inserted along the x-axis, perpendicular to the plane of the front panel 1. As seen in FIGS. 1 to 3, the recesses 13 have an oblong cross sectional shape, i.e. in a cross section along the plane of the front panel 1, wherein the grooves 17 are arranged from the insertion opening 19 side to an inner end 21. To facilitate easy insertion of the dowel 11 into the recess 13, the inner diameter of the insertion opening 19 is somewhat larger than the outer diameter of the dowel 11. In FIGS. 1 to 3, the insertion opening 19 does not have any grooves 17, i.e. the recess surface in the insertion opening is smooth, instead the grooves 17 open up to the insertion opening 19 and extend to the inner end 21. At insertion, the dowel 11 is pushed into the insertion opening 19 until it abuts to the bottom of the recess 13. The dowel 11 is then slid transversally to a central axis of the recess 13, allowing for cooperation between the ridges 15 of the dowel 11 and the corresponding grooves 17 of the recess 13, until the dowel 11 is at the inner end 21 of the grooves 17 of the recess 13. At this fastening position the ridges 15 and grooves 17 interlock to hinder dowel movement along the central axis of the recess 13. Once the dowel 11 has been slid into the fastening position, i.e. to the inner end 21 of the recess 13, it has to be slid back to the insertion opening 19 into a releasing position to be removed from the recess 13 and thereby freeing the side panel 3 from cooperation with the front panel 1.

In FIGS. 1 to 3, the fastening device 102 is modular, comprising a front part 33 and a rear part 35. The rear part 35 is mounted to the short side 4 of the side panel 3, i.e as an extension of the side panel 3 along the x-axis of the drawer. The front part 33 in turn mounts directly to the rear part 35, along the x-axis. Finally, the two dowels 11 of the fastening device 102 are protruding from the front part 33 along the x-axis, as a final forward extension of the side panel 3. The dowels placed different sides of the center point 2 of the front part 33 along the y-axis.

Figure 11:
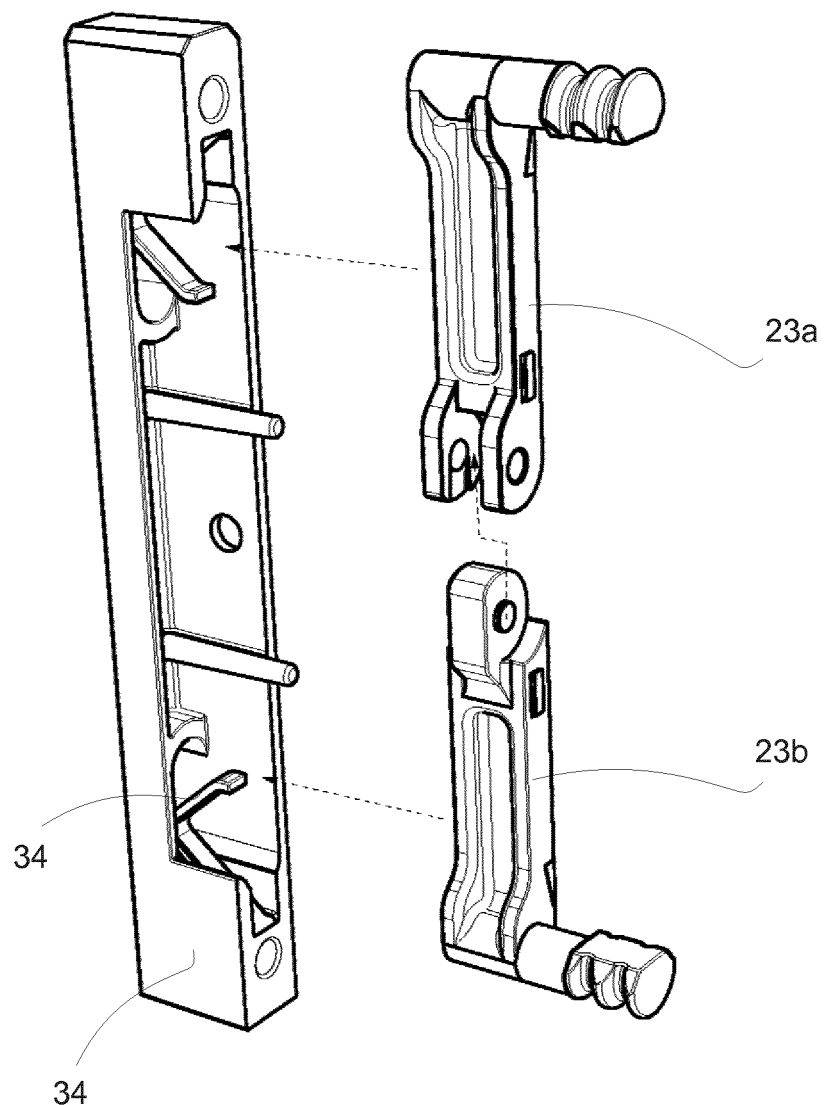
FIG. 11 is a schematic view of a fastening device according to another example of the present invention.

The front part 33 and the rear part 35 may be formed as a single piece 34, as can be seen in FIG. 11.

The two dowels 11 are in turn connected to two dowel pins 27, extending axially into the fastening device 100 along the x-axis of the drawer. The dowel pins 27 are running in lateral guide tracks 29 in the front part 33. The guide tracks 29 have an oblong cross sectional shape, i.e. extending along the y-axis in a cross section along the yz-plane, and restrict the movement of the dowels and dowels pins to lateral and axial movement along the y- and x-axes of the drawer, respectively.

The two dowel pins 27 are connected to the lateral ends of a lever 23. In FIGS. 1-3, the lever 23 consists of two lever arms 23a and 23b, attached to each other in a hinge like fashion. By bending the lever around a hinge joint 25, centrally connecting the two lever arms 23a and 23b, the length of the lever 23 can be expanded or contracted. This will result in lateral movement of the two dowels 11 and dowel pins 27, along the two guide tracks 29.

The dowels 11 and dowel pins 27 may be integrated parts of the lever arms 23a and 23b, as can be seen in FIG. 11.

The lateral ends of the lever 23 are in turn connected to a spring system 49, as seen in FIGS. 1 to 3. The spring system 49 exerts a force on the lateral ends of the lever 23, forcing the lever 23 to contract. The spring system 49 is not limited to the flat spring as shown in FIGS. 1 to 3, but can be any other elastic system such as a regular spring or elastic strap which performs the same function.

The spring system 49 may be an integrated part of a single piece 34 front part 33 and rear part 35, as can be seen in FIG. 11.

When the front part 33 and rear part 35 are mounted together, the lever 23 will be interlocked in an inner compartment 51 formed in the middle of the fastening device 102, as seen in FIGS. 2 and 3. The inner compartment 51 has an opening 47 on at least one side in the xy-plane of the fastening device 102, through which the lever 23 can expand outwards along the z-axis when the hinge joint 25 is bent, as seen in FIG. 3.

The front part 33 further comprises a guide pin 37 and screw connectors 39. The guide pin 37 is a pin protruding outwards from the front part, along the x-axis, positioned laterally of the center point 2. The guide pin 37 is associated with a corresponding guide hole 41 in the front panel 1, in which it will be fitted upon drawer assembly. The off-center position of the guide pin 37 and the guide hole 41, only allows for drawer assembly when the fastening device 102 is correctly mounted on the front panel 1. The screw connectors 39 allows for screws or bolts 43 to securely attach the front part 33 and the rear part 35 to the side panel 3, as seen in FIGS. 1 to 3. The rear part comprises a guide pin 37 and screw connectors 39, with similar function as described above, the guide pin 37 having a corresponding guide hole 41 in the short edge 4 of the side panel 3, ensuring correct mounting of the rear part 35 during drawer assembly.

However, as can be seen in the single piece 34 front part 33 and rear part 35 of FIG. 11, the guide pin is not mandatory but it can be omitted for applications where exact positioning of the fastening device is not crucial, or for embodiments providing other means for correct alignment of the fastening device.

The dowels 11 are thus displaceable in relation to each other in a fastening direction, which is along the side edge of the side panel. However, displacement of the dowels 11 is effected by maneuvering the hinge joint 25 in a direction being different from the fastening direction, namely in a direction being perpendicular to the fastening direction.

Figure 2B:
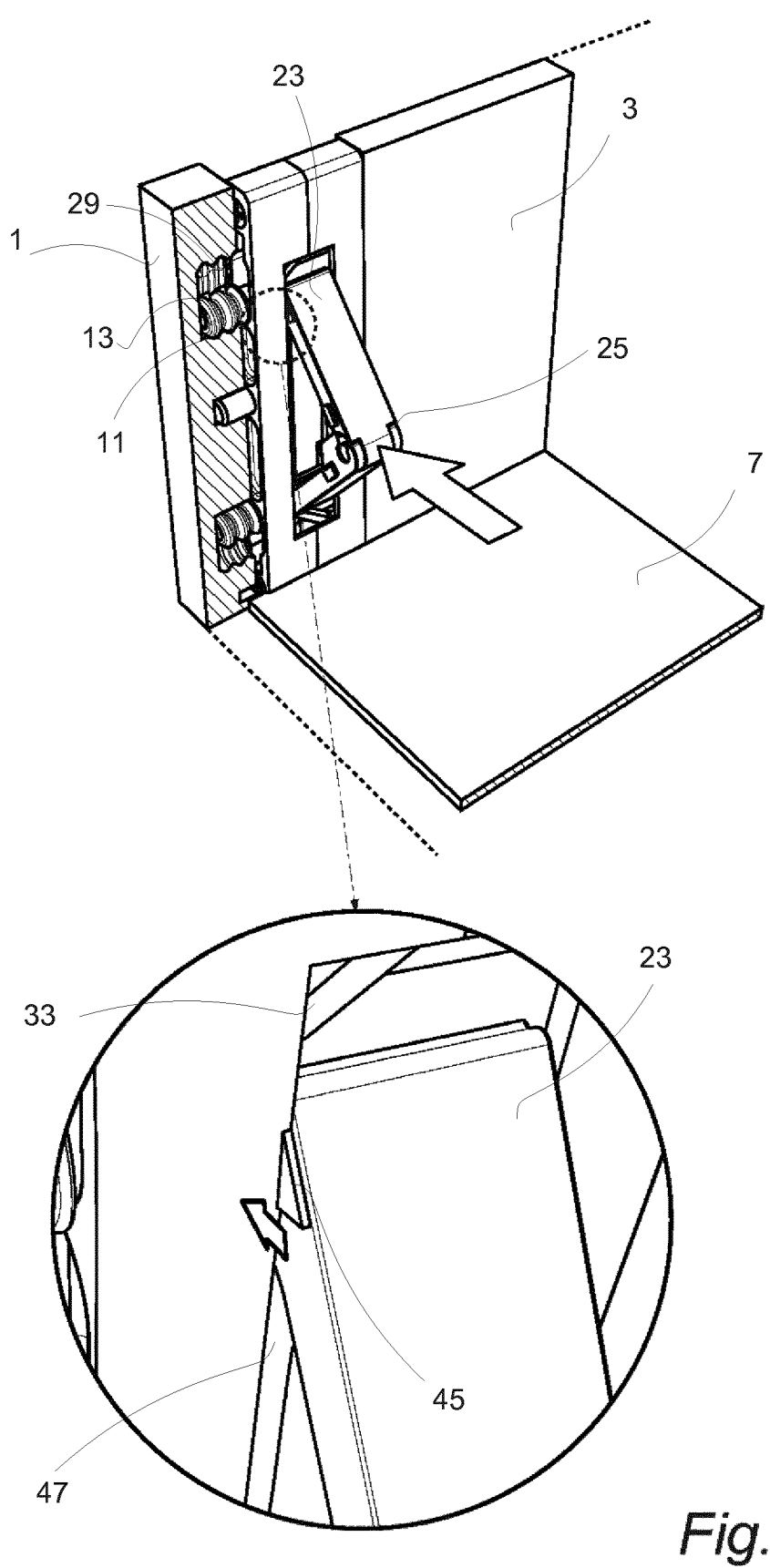
FIG. 2b is a perspective view with a partial cutout of part of a furniture assembly which includes a fastening device according to the present invention in attached and releasing position and a detail view.
Figure 2C:
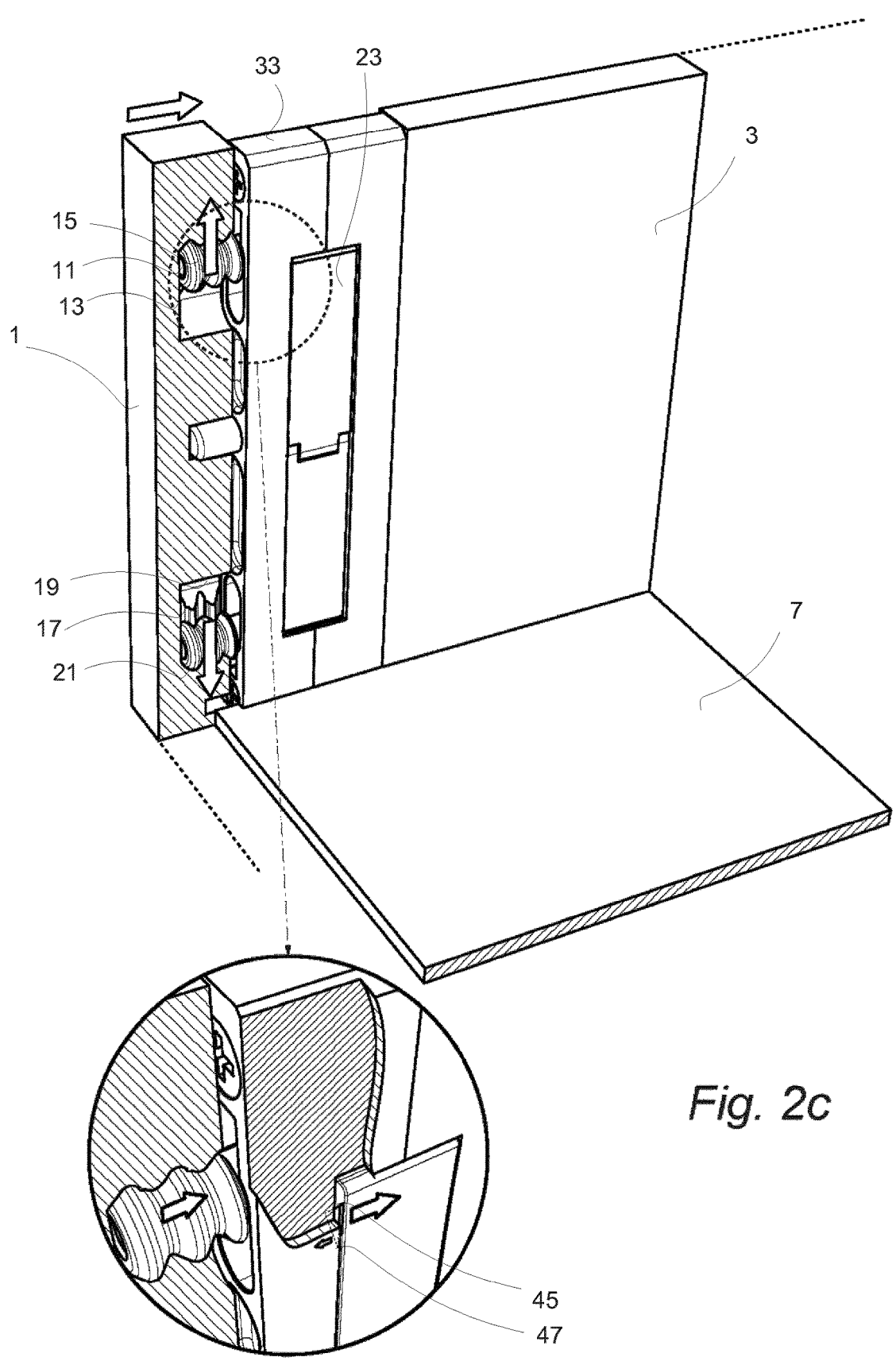
FIG. 2c is a perspective view with a partial cutout of part of a furniture assembly which includes a fastening device according to the present invention in attached and fastening position and a detail view with a partial cutout.
Figure 3A:
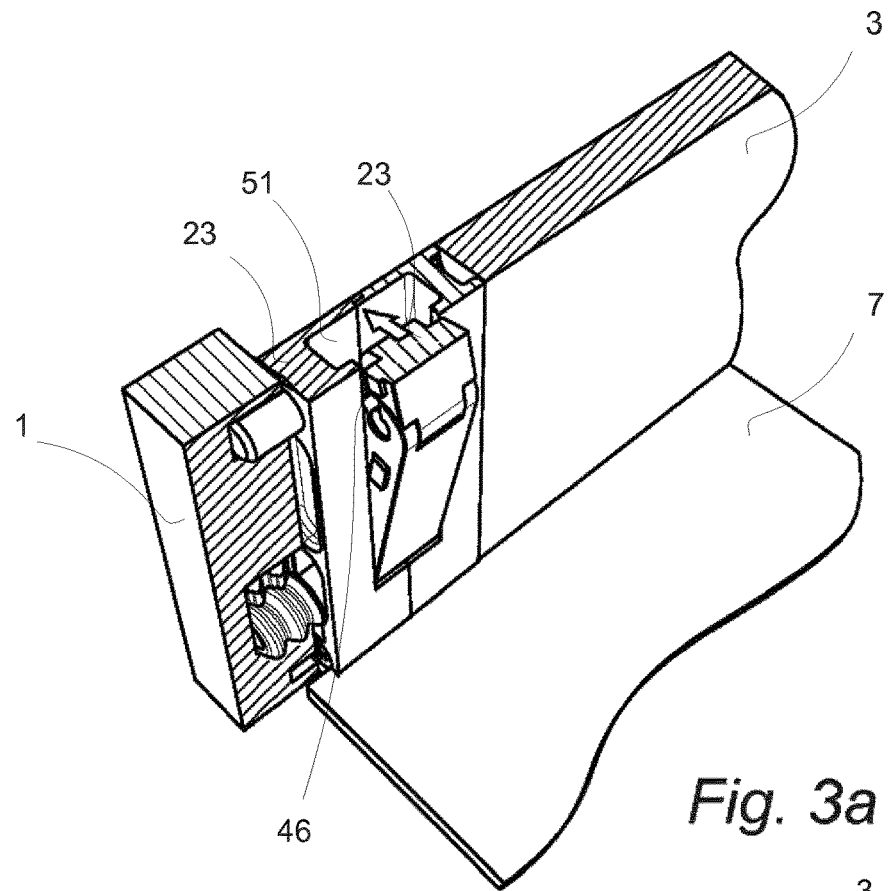
FIG. 3a is a cut out view of the furniture assembly and fastening device of FIG. 2, in attached and semi-fastening position.

FIG. 2*a* shows the fastening device 102 in releasing position, with the lever 23 in retracted position. In this configuration, the dowels 11 are as close to each other as the guide tracks 29 allow. This position corresponds to the insertion opening 19 positions of the two recesses 13, and allows for insertion of the two dowels 11 into the two corresponding recesses 13, respectively. FIG. 2*b* shows the dowels 11 of the fastening device inserted into the recesses 13 on the front panel 1. After the insertion, a force along the z-axis applied to the hinge joint 25 of the lever 23 will move the lever 23 into extended position. When the lever 23 is being extended, the dowels 11 will move latterly, away from each, other along the y-axis as dictated by the guide tracks 29. FIG. 2*c* shows the fastening device 102 in fastened position, with the lever 23 in an extended position. If the dowels 11 are inserted into the recesses 13, such as in FIG. 2*c*, the two dowels 11 will have moved from the insertion opening 19 positions to the inner end 21 position of the recesses 11, allowing for cooperation between the ridges 15 of the dowel 11 and the corresponding grooves 17 of the recess 13. When the lever 23 is fully extended, it will lock into place, keeping the dowels 11 locked into place in the recesses 13, effectively joining the front panel 1 to the side panel 3 of the drawer.

During the movement of the dowels 11 from the insertion opening 19 to the inner end 21 position of the recess 13, the joining panels should be pressed towards each other, here along the x-axis, to ensure a tight fit. In FIGS. 1 to 3, this is achieved by functional pulling ridges 45 positioned on the lever 23, protruding along the x-axis, interacting with the opening 47 walls of the fastening device 102. As seen in the detail of FIG. 2*a*, two functional pushing ridges 44 are extending axially from the lever 23 towards the rear half 35 of the fastening device 102. The pushing ridges 44 are pushing the lever 23 and the dowels 11 axially, towards the front panel 1 when the lever 23 is in retracted position. When the lever 23 is moved into the extended position, said two pushing ridges 44 will reach the inner compartment 51, no longer interact with the opening 47 walls of the fastening device 102. At the same time, two pulling ridges 45 positioned on the opposite side of the lever, extending axially towards the front half 33 of the fastening device 102, will pull the lever 23 and dowels 11 axially, backwards towards the rear part 35, as can be seen in FIG. 2*c*. Thus, the joint between the panels is self-tightened during the locking of the fastening system 100.

Figure 3B:
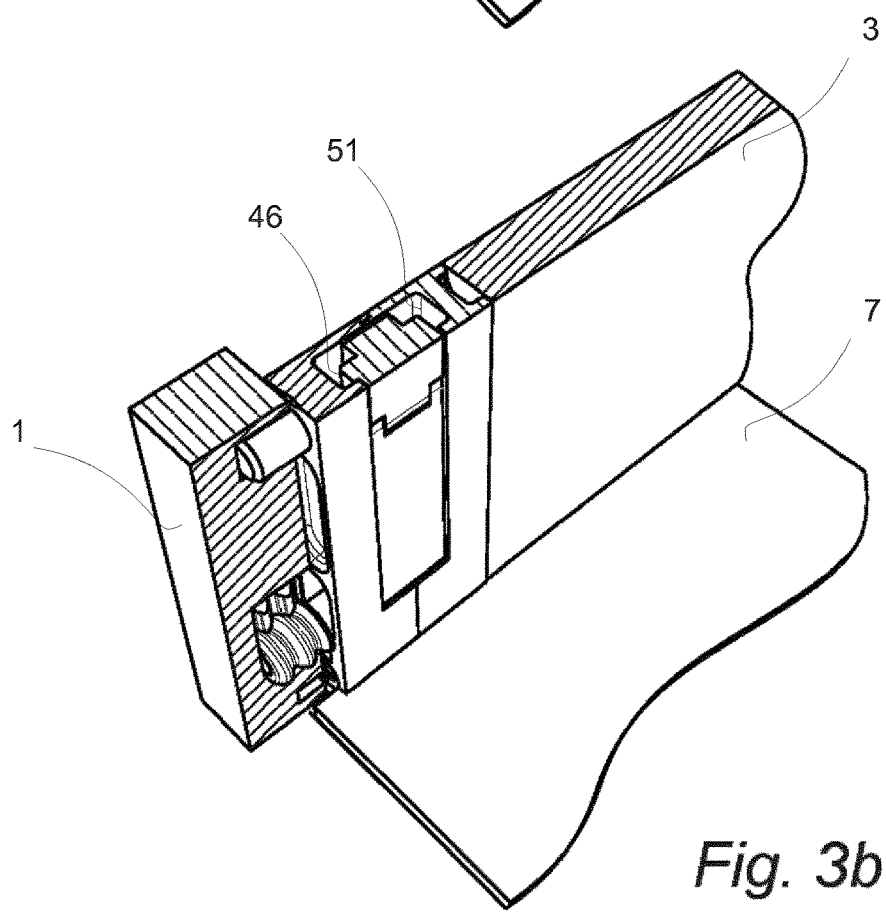
FIG. 3b is a cut out view of the furniture assembly and fastening device of FIG. 2, in attached and fastening position.

The pulling ridges 44 and pushing ridges 45 may also function as stoppers, gently locking the lever 23 into a fully contracted or extended position. In the detail of FIG. 2*b*, a pulling ridge 45 extending axially from the side of the lever 23 is shown acting as a stopper against the front part 33, providing extra initial friction when moving the lever into the opening 47, gently locking the lever 23 into the open position. Similarly, FIG. 3*b* shows a locking ridge 46 extending axially on a fully extended lever 23 which rests against the inner wall of the compartment 51 of the front part 33, thus requiring a larger initial force to move out of the opening 47 to an open position.

Figure 4A:
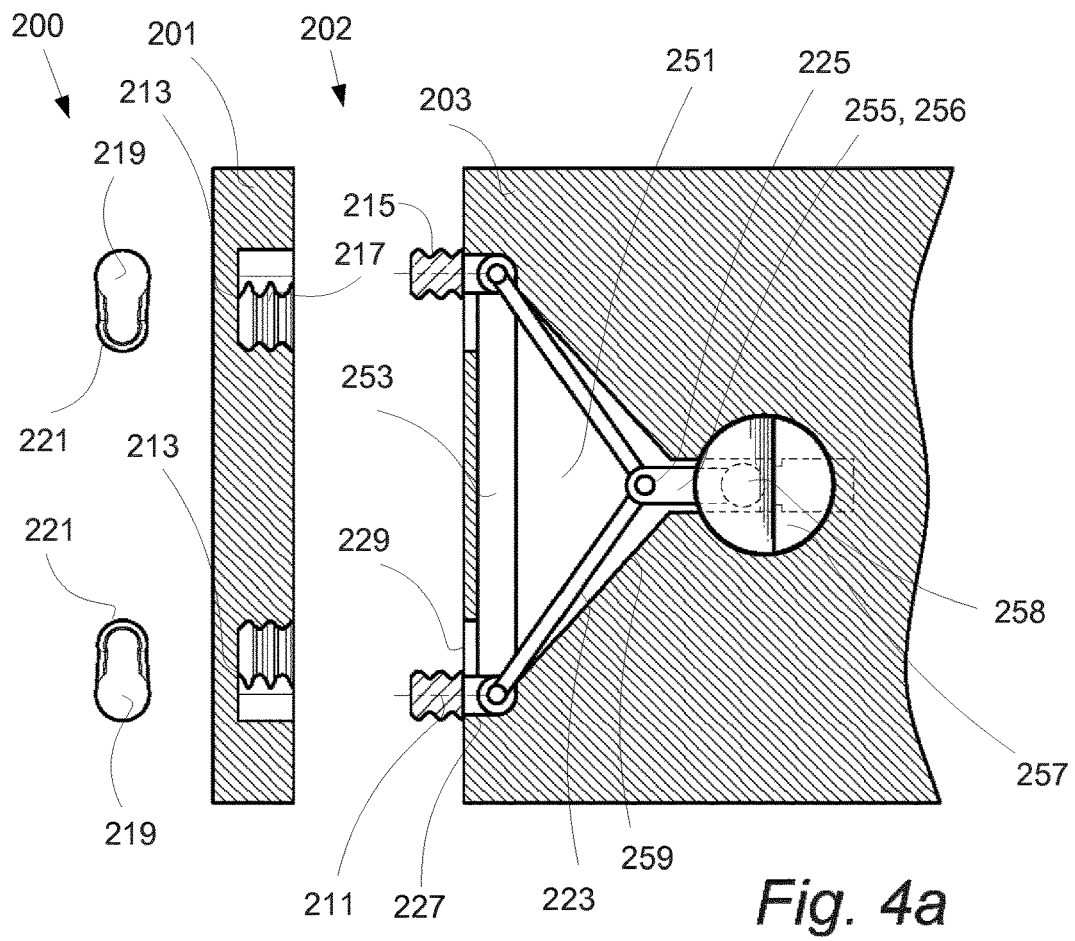
FIG. 4a is a schematic view of a furniture assembly which includes a fastening device according to another example of the present invention in detached and releasing position.
Figure 4B:
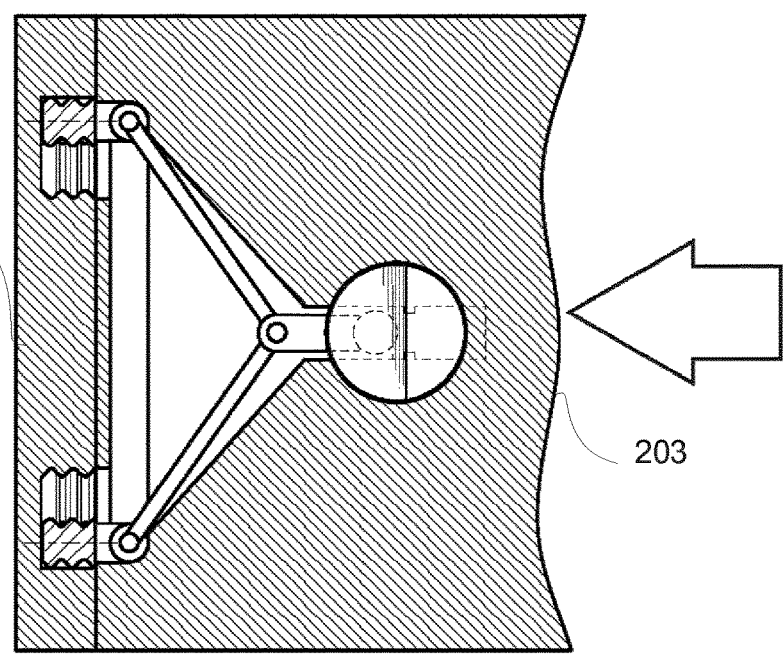
FIG. 4b is a schematic view of a furniture assembly which includes a fastening device according to another example of the present invention in attached and releasing position.

In another example of the invention according to FIG. 4, a fastening system 200 is used to assemble a front 201 panel, two side panels 203, a rear panel and a bottom panel into a finished drawer. One fastening device 202 is attached to, or integrated in, each side panel 203 as shown in FIG. 4. The dowels 211 have a number of ridges 215 which co-operate with a number of corresponding grooves 217 in the recesses 213 as described above.

The fastening device 202 lever 223 is positioned in a compartment 251 along the longitudinal plane of the side panel 203, in the xy-plane of the drawer, with the hinge joint 225 axis along the z-axis. As a consequence, the lever 223 will expand and contract in the xy-plane when its hinge joint 225 is bent.

Two dowels 211 are placed in a track 253 which extends along the y-axis. The dowels 211 are connected to dowel axes 227 extending axially through guide tracks 229, which are extending along the y-axis and restrict the movement of the dowels 211 to lateral and axial movement, along the height and length axes.

The dowel axes 227 connect to the lateral ends of the lever 223 in a hinge-like fashion. The lever 223 hinge joint 225 is connected to a crankshaft 255, which in turn is connected to a turn dial 257, both positioned in the xy-plane of the drawer. By turning the turn dial 257 around the z-axis, the crankshaft 255 will either push or pull the lever 223, expanding or contracting the lever 223 between an open and closed position.

Alternatively, the lever 223 hinge joint 225 may be connected to a shaft 256, which in turn is connected to a slide button 258, both positioned in the xy-plane of the drawer. By sliding the slide button 258 along the x-axis, towards the front of the back of the drawer, the shaft 256 will either push or pull the lever 223 axially, expanding or contracting the lever 223 between an open and closed position.

Figure 4C:
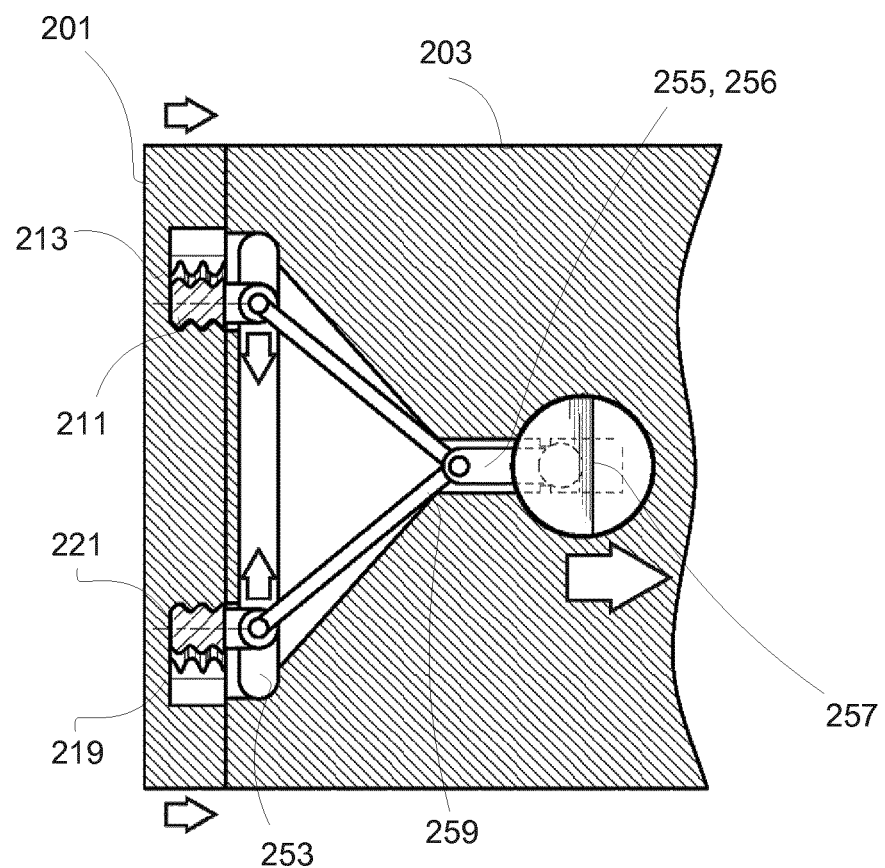
FIG. 4c is a schematic view of a furniture assembly which includes a fastening device according to another example of the present invention in attached and fastening position.

As seen in FIG. 4*a*, the compartment 251 has walls 259 which restrict the movement of the lever 223. FIG. 4*a* shows the fastening device 202 in a releasing position, where the crankshaft 255 pushes the lever 223 to its expanded position. In extended position, the dowels 211 are at their maximum lateral allowed distance away from each other, which corresponds to the distance between the insertion openings 219 of the two recesses 213 in the front panel 201. FIG. 4*c* shows the fastening device 202 in a fastening position, where the lever 223 is pulled backwards by the crankshaft 255, and forced to contract by the compartment walls 259. In the contracted position, the dowels 211 are at their minimum lateral allowed distance from each other, which corresponds to the distance between the inner end 221 of the two recesses 213 in the front panel 201, thereby locking the front panel 201 to the side panels 203 in a furniture assembly.

During the lateral movement of the dowels 211 from the insertion opening 219 to the inner end 221 position of the recess 213, the joining panels should be pressed towards each other, to ensure a tight fit. In the example of FIG. 4, this is achieved by a limited axial backwards and forwards movement of the dowels 211, similar to the axial movement of the crankshaft 255. When the lever 223 is pushed into its extended position, the dowels 211 are pushed a short distance axially towards the front panel 201. When the lever 223 is pulled to its contracted position, the dowels 211 are also pulled axially backwards towards the turn dial, as seen in FIG. 4*c*. Thus, the joint between the panels is self-tightened during the locking of the fastening device 202.

In an example of the invention according to FIG. 5, a fastening system 300 is used to assemble a front 301 panel, two side panels 303, a rear panel and a bottom panel into a finished drawer. One fastening device 302 is attached to or integrated in each side panel 303 as shown in FIG. 5. The dowels 311 have a number of ridges 315 which co-operate with a number of corresponding grooves 317 in the recesses 313 as described above.

As seen in FIG. 5, the fastening device 302 may use a wedge 361 for moving the dowels 311 laterally towards or away from each other, between an open or closed position. Each dowel 311 is connected to a block 363, in FIG. 5 in the shape of pentagons with the oblique sides facing the wedge 361. The blocks 363 are placed in a track which permits movement in the xy-plane of the drawer, but not out of the plane. Guide openings restrict the maximum and minimum distance between the two dowels 311. When the wedge 361 is pushed axially in between the blocks 363, the blocks 363 are forced apart, moving the dowels 311 laterally away from each other.

Figure 5A:
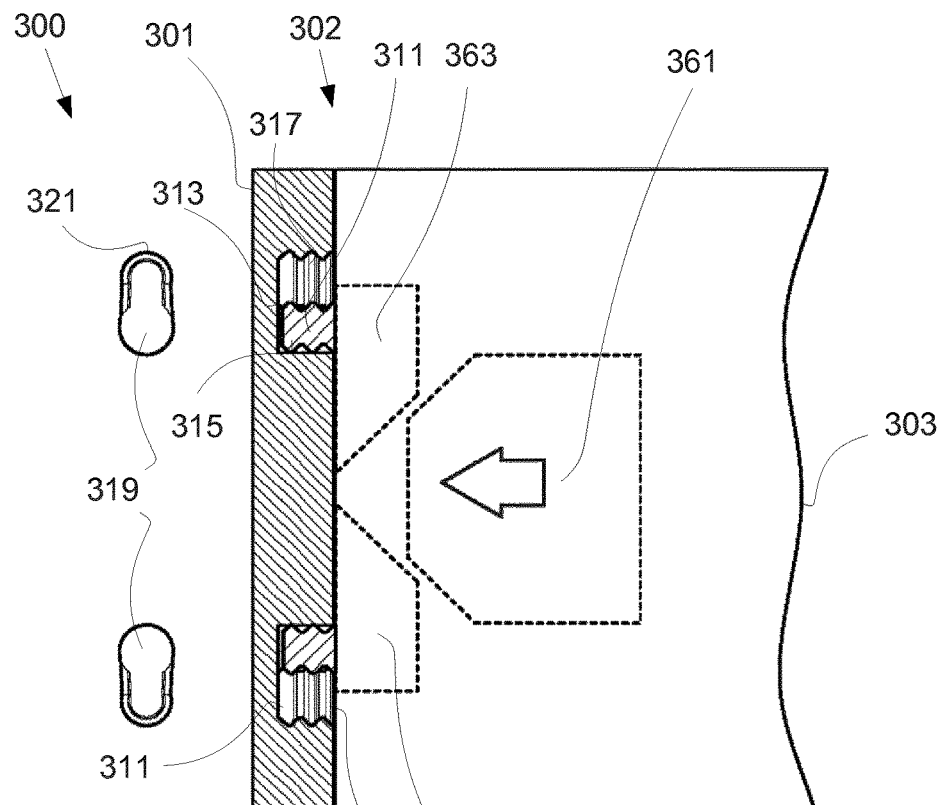
FIG. 5a is a schematic view of a furniture assembly which includes a fastening device according to another example of the present invention in attached and releasing position.
Figure 5B:
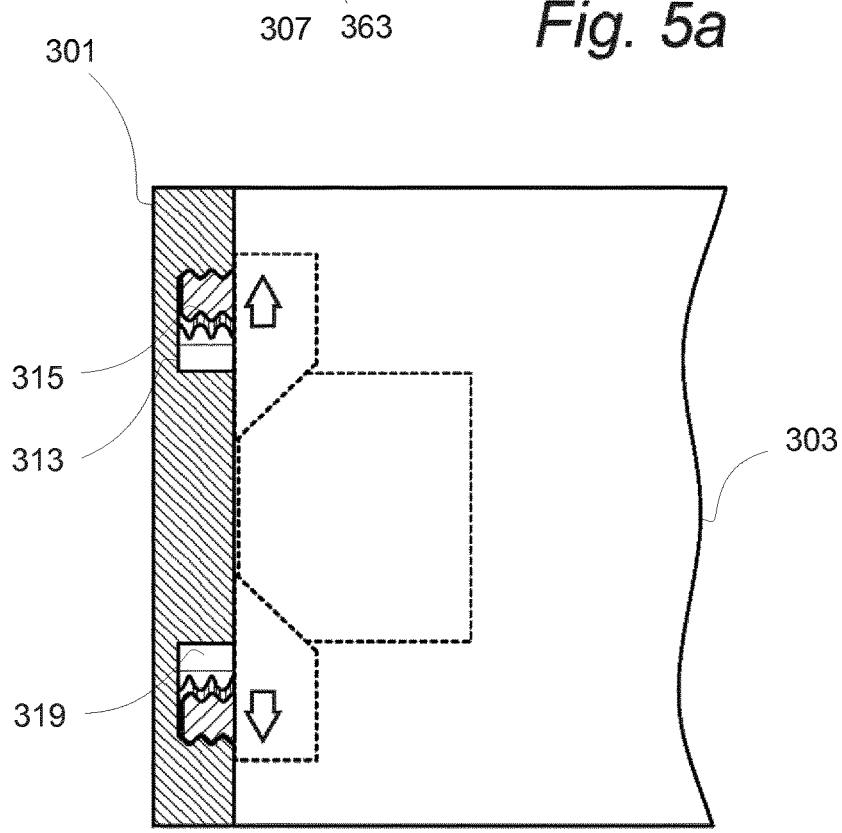
FIG. 5b is a schematic view of a furniture assembly which includes a fastening device according to another example of the present invention in attached and fastening position.

FIG. 5a shows side panel 303 connected to the front panel 301 with the fastening device 302 in releasing position. The dowels 311 are at their minimum allowed lateral distance from each other, which corresponds to the distance between the insertion openings 319 of the two recesses 313 in the front panel 301 along the y-axis. FIG. 5b shows the fastening device 302 in a closed position, with the dowels 311 in their expanded position, which corresponds to the distance between the inner ends 321 of the two recesses 313 in the front panel 301 along the y-axis.

FIG. 6 is an example of how a side panel 403 in itself can be an integrated part of a fastening system 400. Here, the fastening system 400 is used to assemble a front 401 panel, two side panels 403, a rear panel 405 and a bottom 407 panel into a finished drawer. The dowels 411 have a number of ridges 415 which co-operate with a number of corresponding grooves 417 in the recesses 413 as described above.

As shown in FIG. 6, the side panels 403 are built up from two half-panels 465 connected to each other in a hinge-like fashion along the long edges of the half-panels 465. The dowels 411 are connected to the short side of the side panel 403, extending along the longitudinal plane of the side panel and the xy-plane of the drawer. By bending the two half panels 465 around the hinge joint 425 along x-axis, the height of the side panel 403 can be expanded or contracted. As a result, the two dowels 411 will move laterally towards or away from each other when the side panel 403 is contracted or expanded, respectively.

Figure 6A:
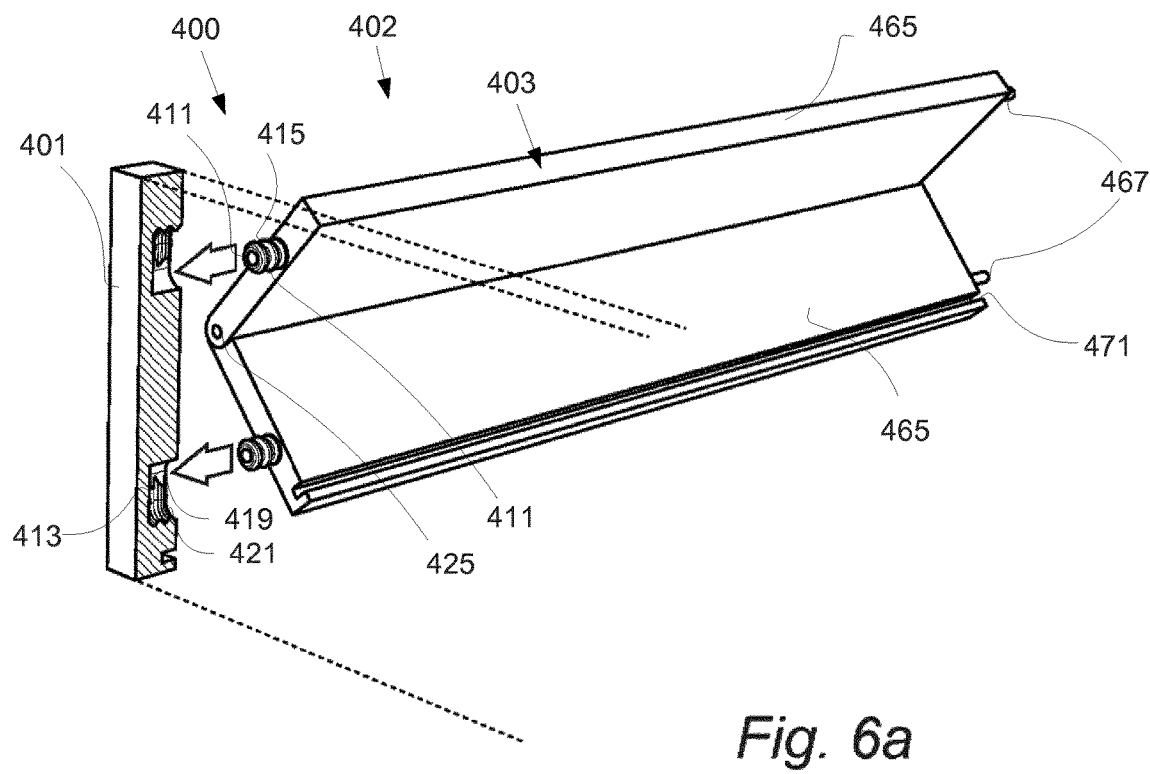
FIG. 6a is a schematic view of includes a fastening device according to an example of the present invention in detached and releasing position.
Figure 6B:
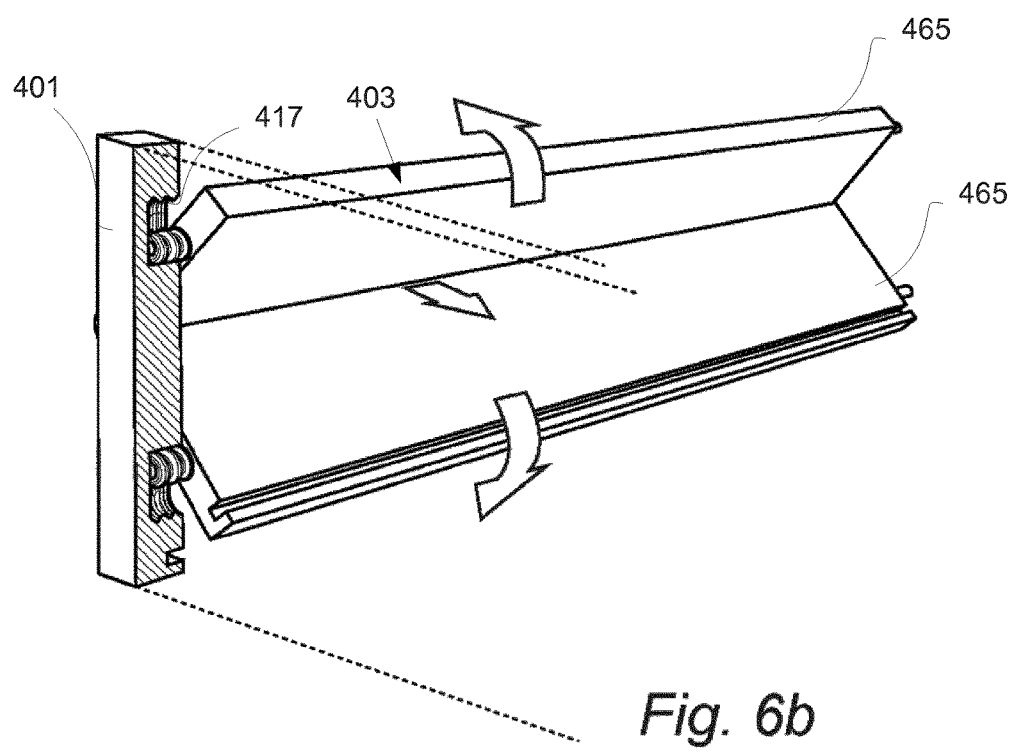
FIG. 6b is a schematic view of includes a fastening device according to an example of the present invention in attached and releasing position.

When the side panel 403 is bent around the hinge joint 425, preferably to a minimum angle (here 90 degrees), this defines the minimum distance between the two dowels 411, which corresponds to the distance between the insertion openings 419 of the two recesses 413 in the front panel 401, as seen in FIGS. 6a and 6b. When the side panel 403 hinge joint 425 is not bent (i.e. at its maximal angel of 180 degrees), it defines the maximum distance between the two dowels 411, which corresponds to the distance between the inner ends 421 of the two recesses 413 in the front panel 401, which can be seen in FIG. 6c.

Figure 6C:
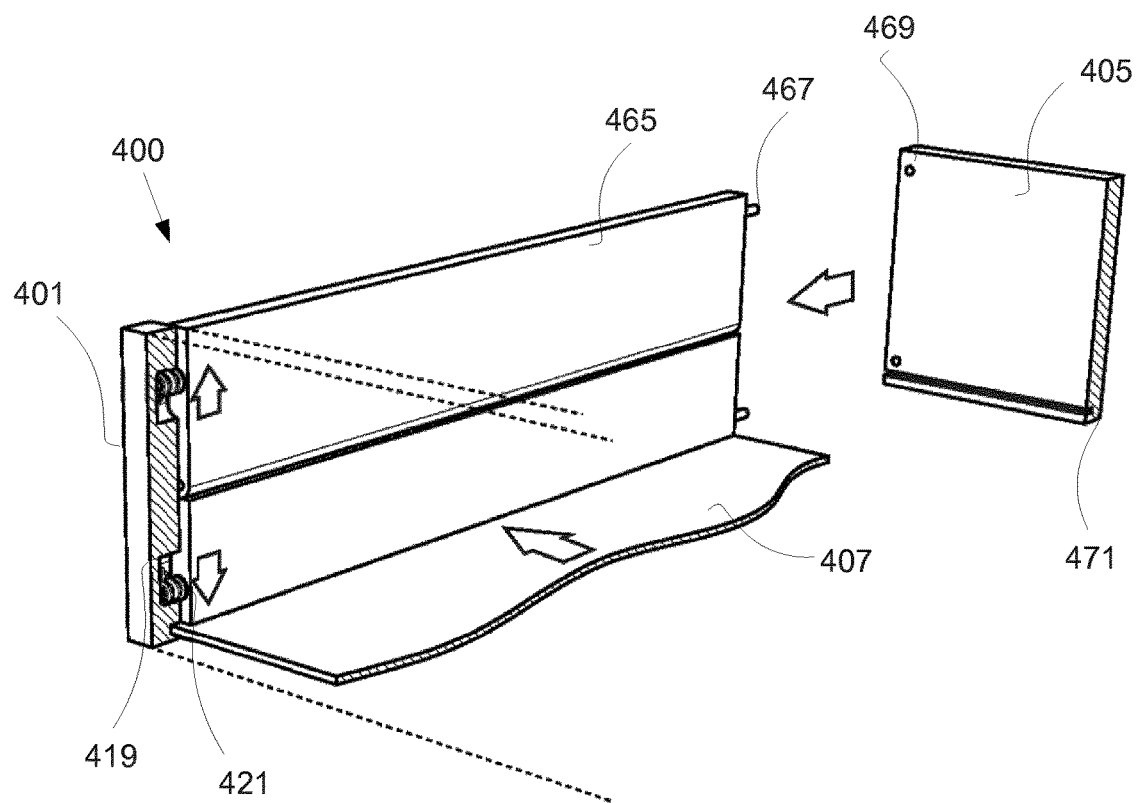
FIG. 6c is a schematic view of includes a fastening device according to an example of the present invention in attached and fastening position, indicating the rear panel as locking the fastening device.

To lock the fastening device 402 after the front panel has been joined to the two side panels, the bottom panel 407 and rear panel 405 are mounted, as seen in FIG. 6c. By first sliding the bottom panel 405 into ridges 471 running along the bottom of all panels and then attaching the rear panel 405 with pins 467 corresponding to pin holes 469 in the side panels, the side panels will remain in its expanded configuration, keeping the side panels 403 locked to the front panel 401.

In an example of the invention according to FIG. 7, a fastening system 500 is used to assemble a front 501 panel, two side panels 503, a rear panel and a bottom panel into a finished drawer. One fastening device 502 is attached to or integrated in each side panel 503 as shown in FIG. 7. The dowels 511 have a number of ridges 515 which co-operate with a number of corresponding grooves 517 in the recesses 513 as described above.

Figure 7A:
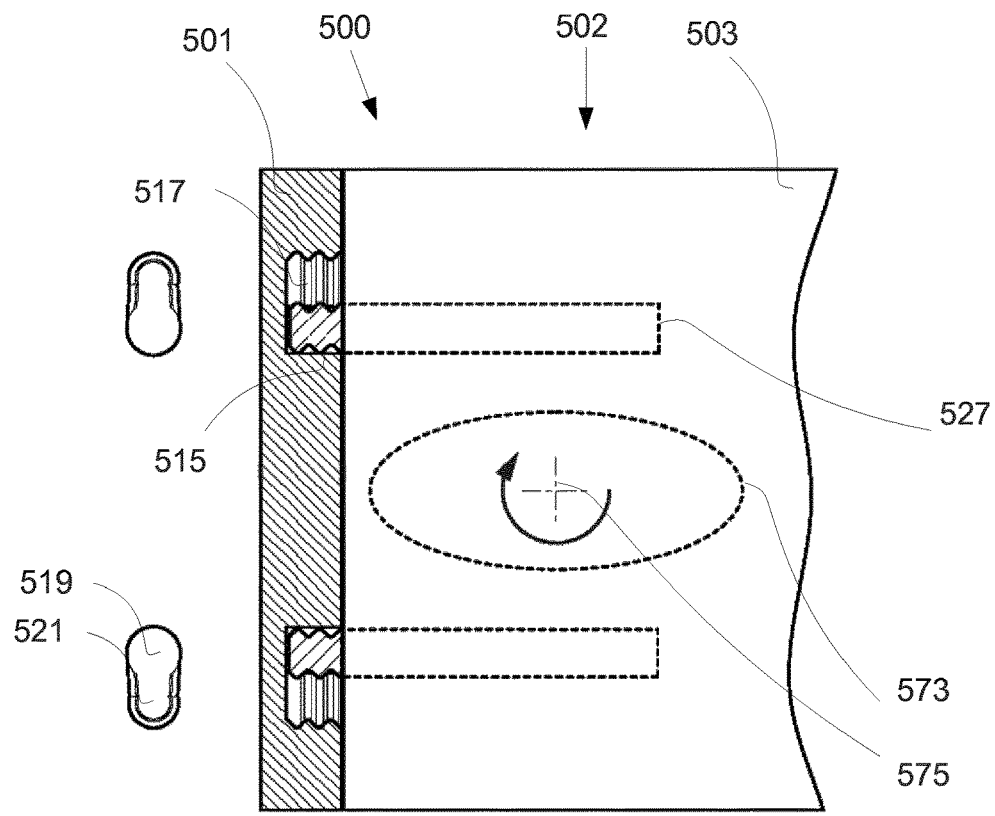
FIG. 7a is a schematic view of a furniture assembly which includes a fastening device according to another example of the present invention in attached and releasing position.
Figure 7B:
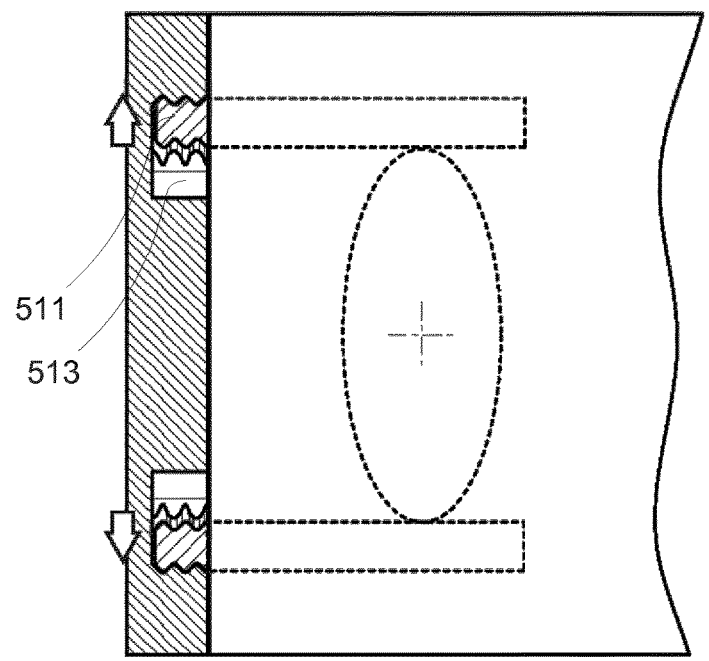
FIG. 7b is a schematic view of a furniture assembly which includes a fastening device according to another example of the present invention in attached and fastening position.

As seen in FIG. 7, the fastening device 502 may use an eccenter 573 which can be rotated around its central axis 575, which extends along the z-axis, normal to the xy-plane. Due to its elliptical shape, the width of the eccenter 573 will have a minimum and maximum value separated by 90 degrees of rotation around the central axis 575. The dowels 511 are connected to rod-like dowel axes 527, in FIG. 5 projecting backwards from the dowels 511 into the side panel 503 along the xy-plane. The Dowel axes 527 are placed in a track which permits movement along the y-axis, but restricts movement in the xz-plane. Slots restrict the maximum and minimum distance between the two dowels 511. When the eccenter 573 is rotated, it makes contact with the two dowel axes 527 forcing them apart, moving the dowels 511 away from each other. FIG. 7a shows side panel 503 connected to the front panel 501 with the fastening device 502 in releasing position. The dowels 511 are here at their minimum allowed distance from each other, which corresponds to the distance between the insertion openings 519 of the two recesses 513 in the front panel 501. FIG. 7b shows the fastening device 502 in a closed position, with the dowels 511 in their expanded position, which corresponds to the distance between the inner ends 521 of the two recesses 513 in the front panel 501. The dowel axes 527 are fixed in a lengthwise direction along the x-axis, locking the front panel to the side panels when the fastening device 502 is in its closed position.

Figure 8A:
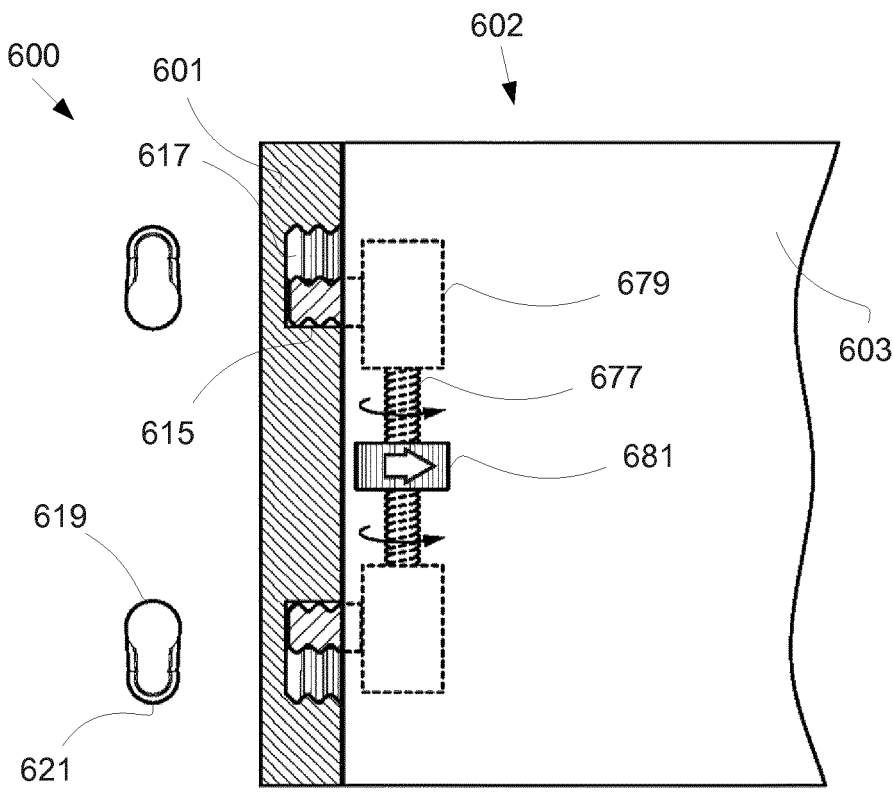
FIG. 8a is a schematic view of a furniture assembly which includes a fastening device according to another example of the present invention in attached and releasing position.
Figure 8B:
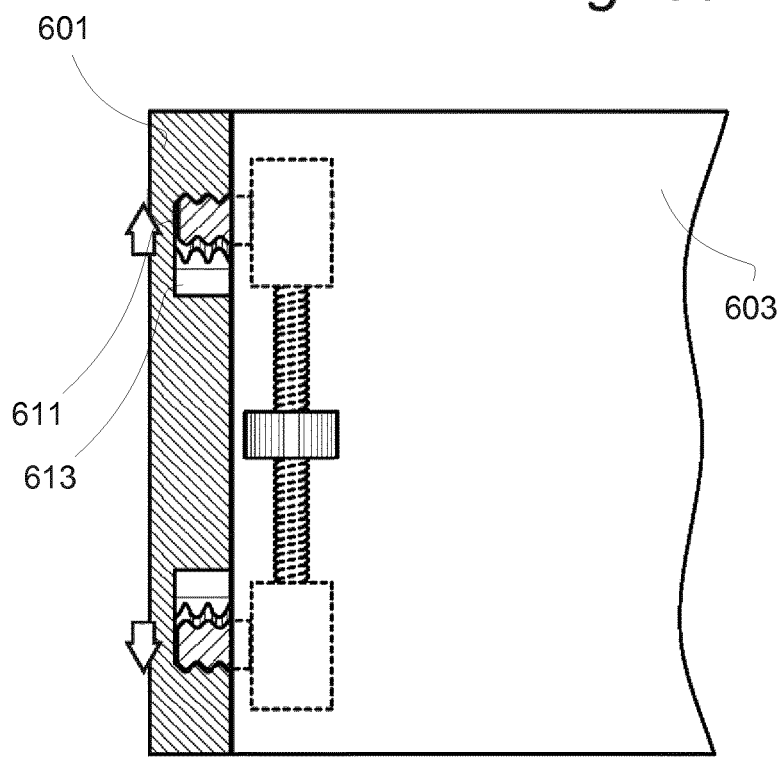
FIG. 8b is a schematic view of a furniture assembly which includes a fastening device according to another example of the present invention in attached and fastening position.

In another example of the invention, as seen in FIG. 8, the movement of the dowels 611 is by means of a threaded rod 677. The dowels 611 are connected to bolts 679, which in turn are interconnected by the threaded rod 677, extending along the y-axis. The bolts 679, and thereby the dowels 611, can be moved laterally towards or away from each along a track 653, by turning the treaded rod 677. A turning knob 681 is attached to the middle of the threaded rod 677, between the dowels 611. By turning the knob 681 clockwise or anticlockwise, the dowels 611 will moved laterally between a maximum and minimum distance from each other. When the dowels 611 are at the minimum distance from each other, this corresponds to the distance between the insertion openings 619 of the two recesses 613 in the front panel 601. When the dowels 611 are at their maximum distance from each other, this corresponds to the distance between the inner ends 621 of the two recesses 613 in the front panel 601.

FIG. 8a shows a side panel connected to the front panel, with the fastening device 602 in releasing position. FIG. 6b shows the fastening device 602 in a fastening position, the front panel 601 locked to the side panels 603.

Figure 9A:
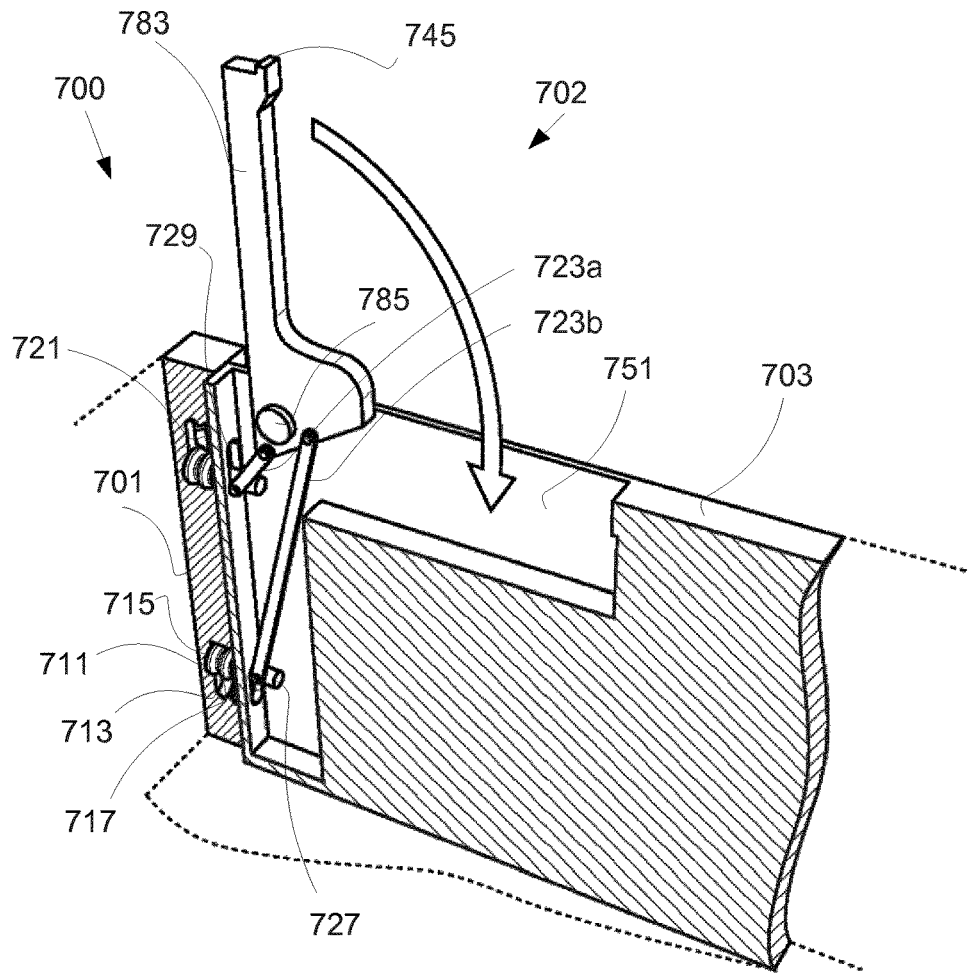
FIG. 9a is a schematic view of a furniture assembly which includes a fastening device according to another example of the present invention in attached and releasing position.

In another example of the invention according to FIG. 9, the dowels 711 of a fastening system 700 are moved laterally towards or away from each other along one axis by means of a lever 723 attached to an arm 783 which functions as a teeter.

The arm is mounted inside a compartment 751 in the side panel 703, with a rotation axis 785 at one end, around which the can be moved in the xy-plane. Two guide tracks 729, one for each dowel 711 restrict the maximum and minimum distance between the two dowels 711. The dowels 711 are connected to dowel axes 727, which connect to the outmost ends of the lever 723 in a hinge-like fashion. The lever 723 has two halves, which are each connected to the arm 783 on different sides of the rotation axis 785, making the arm 783 and rotation axis 785 function as a lever and a fulcrum respectively when moved, pushing one dowel 711 at the same time as it pulls the other, and vice versa. When the arm 783 is in upright open position, the dowels 711 are as in releasing position. When the arm 783 is folded into the side panel 703, the dowels 711 are in a fastening position, as described above.

Figure 9B:
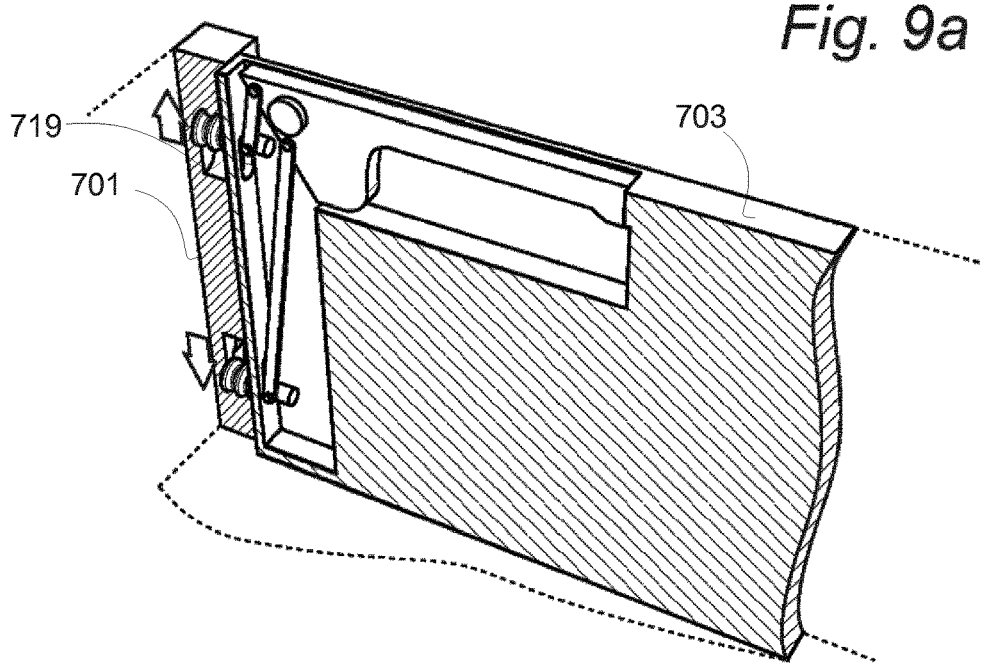
FIG. 9b is a schematic view of a furniture assembly which includes a fastening device according to another example of the present invention in attached and fastening position.

The arm 783 fits in a compartment 751 inside the side panel 703, and a ridge 745 locks the arm 783 into place when in locked position, as can be seen in FIG. 9b.

In another example of the invention according to FIG. 10, a fastening system similar to the example of FIG. 4, has a lever 823 positioned in a compartment 851 along the xy-plane in the side panel 803. As a consequence, the lever 823 will expand and contract in the xy-plane when its hinge joint 825 is bent.

Similar to that of FIG. 6, the side panels 803 are built up from two half-panels 865a and 865b connected to each other in a hinge-like fashion. However, as seen in FIG. 10, the half panels 865a and 865b are connected are along a hinge joint 889 extending vertically along the y-axis in the center of the side panel 803.

Two dowels 811 are placed in a track 853 which permits movement in the xy-plane, but not out of the plane. The dowels 811 are connected to dowel axes 827, which connect to the outmost ends of the lever 823 in a hinge-like fashion. The lever 823 hinge joint 825 is connected to a shaft 887, which in turn is connected to furthermost half panel 865b. By bending the two half panels 865a and 865b around the vertical hinge joint 889, the shaft 887 will either push or pull the lever 823, expanding or contracting the lever 823 between an open and closed position.

Figure 10B:
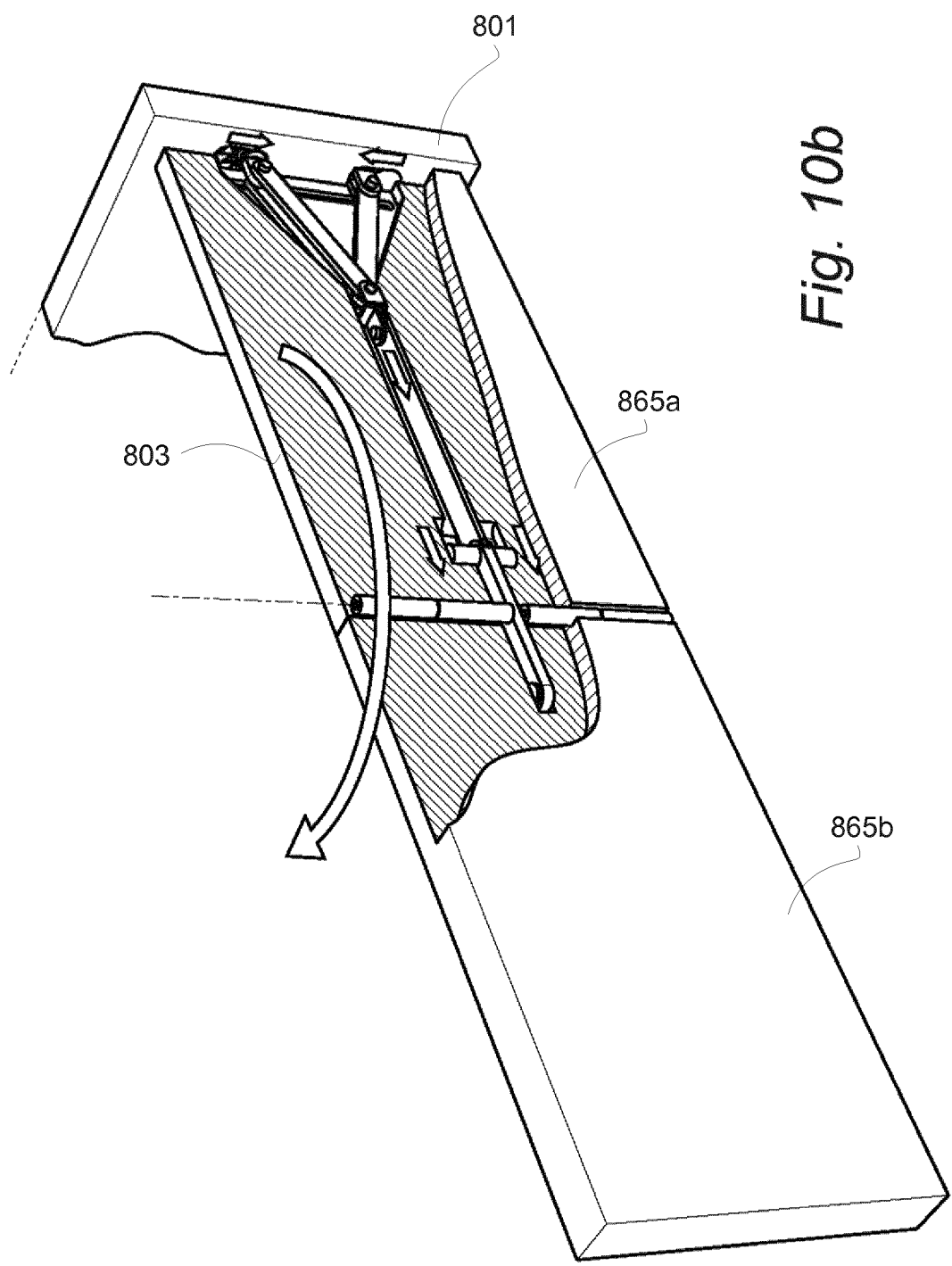
FIG. 10b is a schematic view of a furniture assembly which includes a fastening device according to another example of the present invention in attached and fastening position.

The function is similar to that of FIG. 4, with the exception that the fastening system 800 is in releasing position when the two half panels 865a and 865b are folded towards each other, as seen in FIG. 10a, and in fastening position when folded away from each other, as seen in FIG. 10b.

In another example of the invention according to FIGS. 12 to 15, a fastening device 902 is used in the assembly of a first furniture part to a second furniture part.

Figure 12:
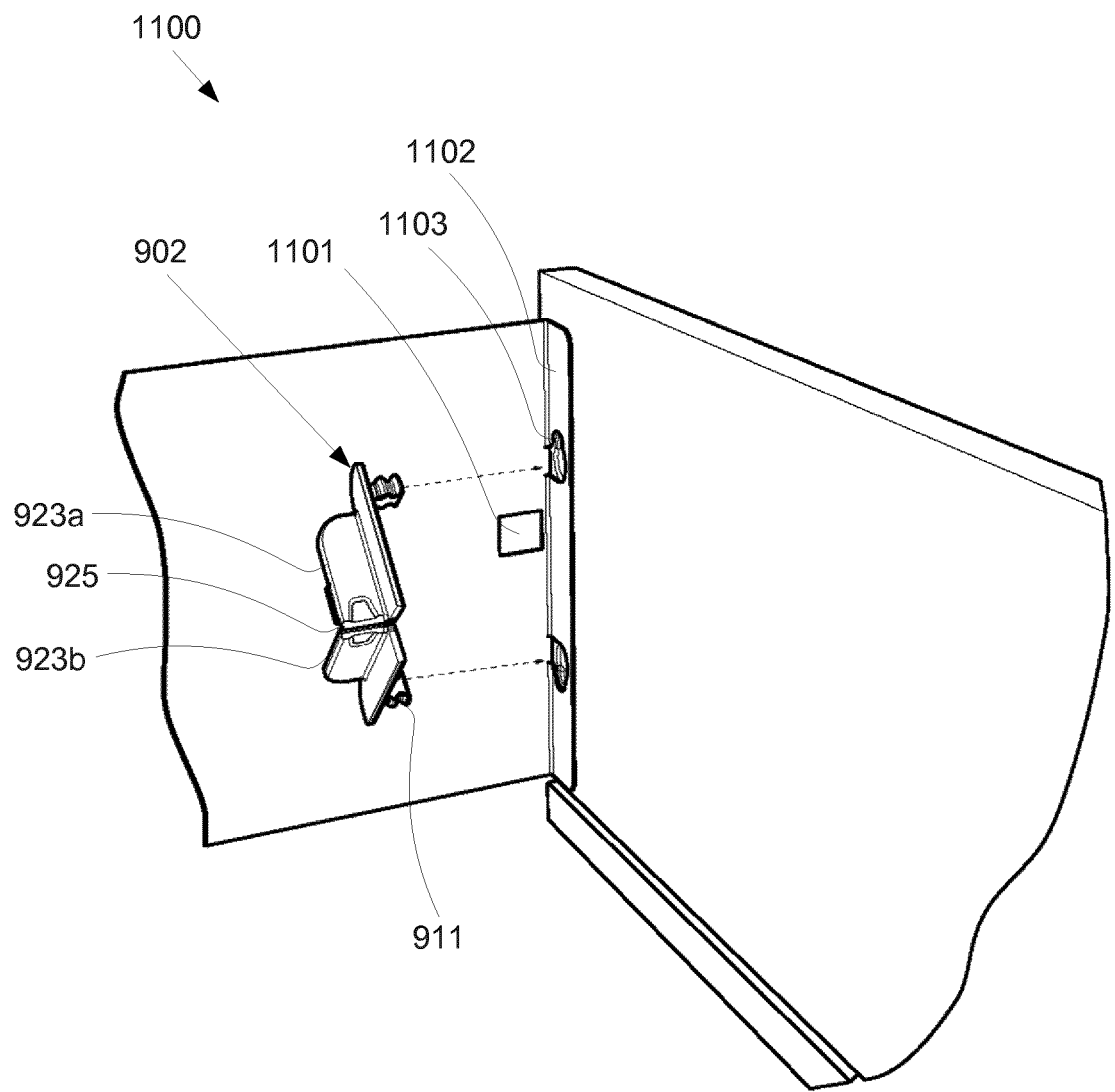
FIG. 12 is a schematic view of a fastening system, including a first furniture part, a second furniture part and a fastening system according to another example of the present invention in detached and releasing position.

As can be seen in FIG. 12, the fastening device 902 comprises at least two dowels 911. The dowels 911 are each connected to a respective lever arm 923a, 923b and the lever arms 923a, 923b are connected to each other at a hinge joint 925. This allows one dowel 911 to be displaced in relation to the other dowel 911 between a fastening position and a releasing position of the fastening device 902. Hence, when the fastening device 902 is folded, i.e. when the lever arms 923a, 923b are pivoted around the hinge joint 925, the dowels 911 are arranged closer to each other than when the fastening device 902 is unfolded. In the unfolded state, the angle of the pivot joint 925 is approximately 180°.

Figure 13:
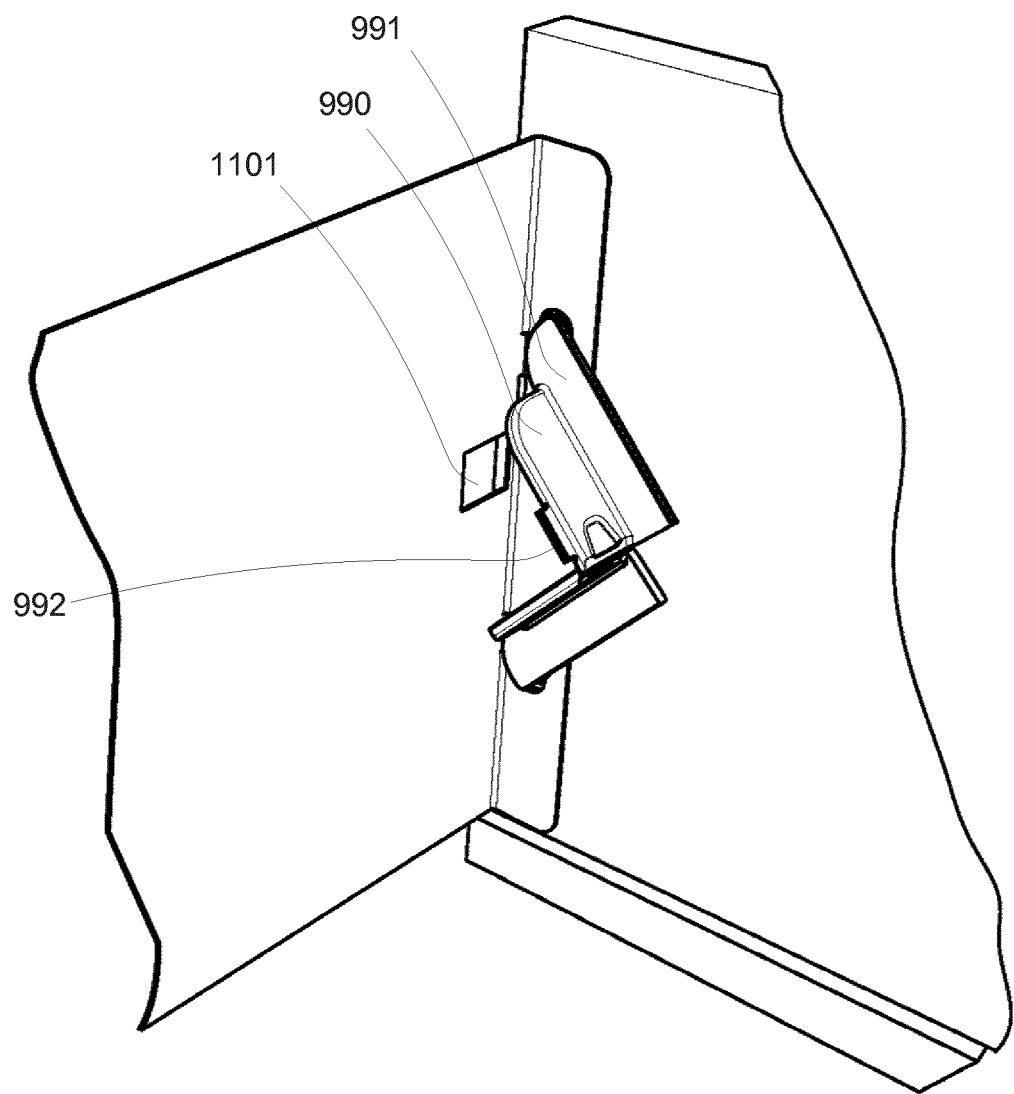
FIG. 13 is a schematic view of a fastening system, including a first furniture part, a second furniture part and a fastening system in attached and releasing position.
Figure 14:
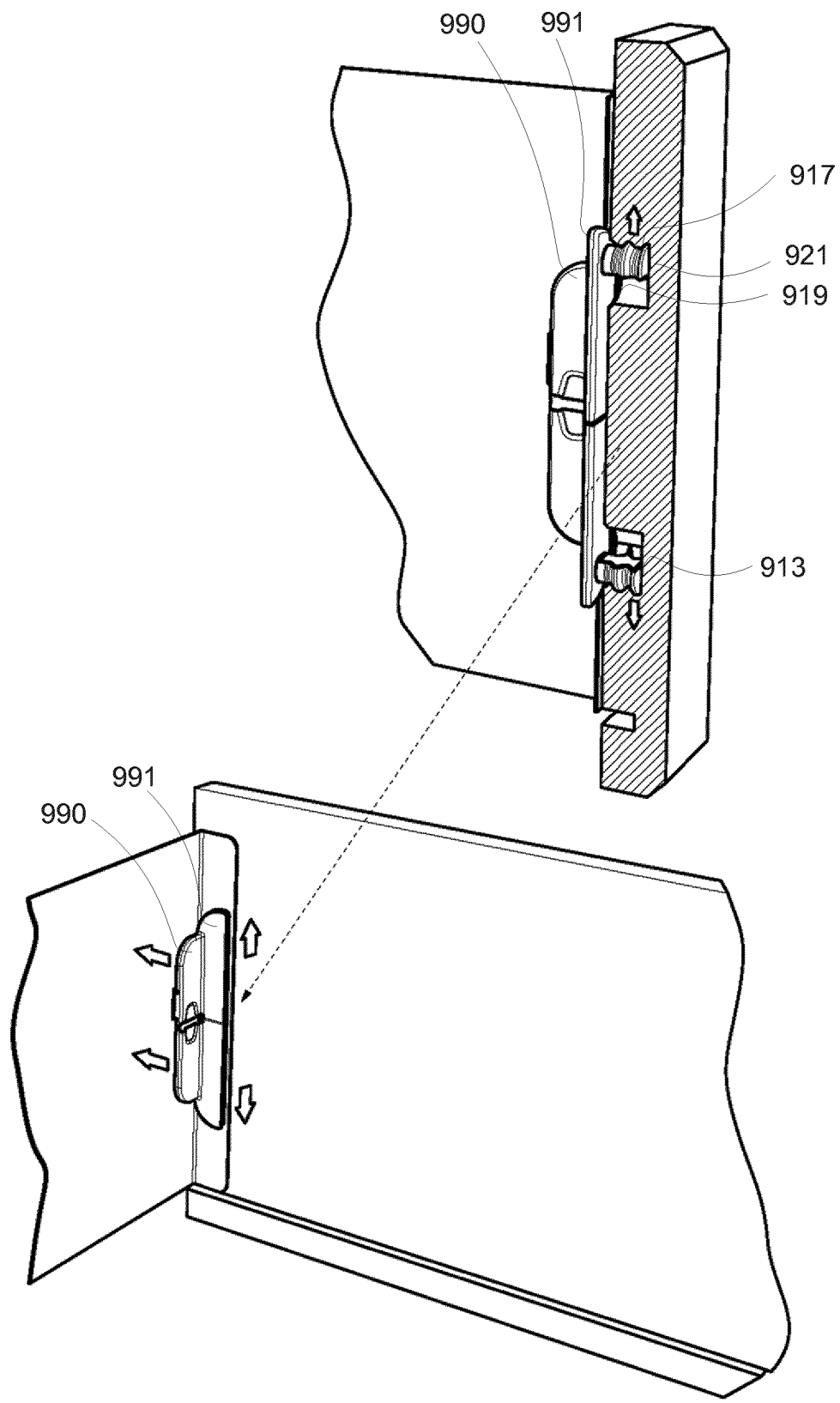
FIG. 14 is a schematic view and a cut out view of a fastening system, including a first furniture part, a second furniture part and a fastening system in attached and fastening position.

Each lever arm 923a, 923b comprises a side flange 990 extending in an axial direction of the dowels 911, and a support web 991, as seen in FIG. 13. The side flange 990 is perpendicular to the support web 991 and the side flange 990 and the support web 991 extend across the hinge portion 925. The at least two dowels 911 are extending axially out from the support web 911. As shown in FIGS. 12 and 15b, the fastening device might include a guide portion 996 at the proximal end of the dowel 911 contacting the support web 991.

The support web 991 is configured to be folded when the fastening device 902 is in open configuration, and is extending linearly when the fastening device 902 is in closed configuration. Thus the support web 991 defines the minimal distance between the at least two dowels 911, while protecting the hinge joint 925 from forces acting on the at least two dowels 911 when the fastening device 902 is in closed configuration.

Figure 15A:
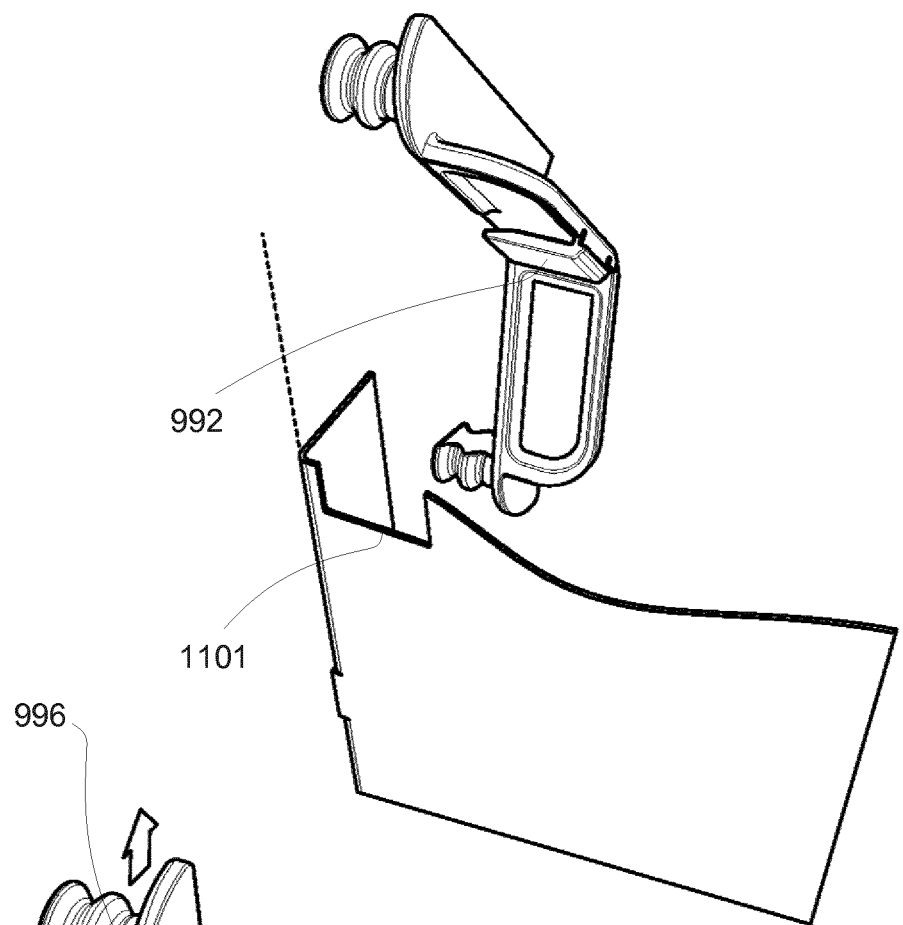
FIG. 15a is a schematic view of a fastening device and a first furniture part in detached and releasing position.
Figure 15B:
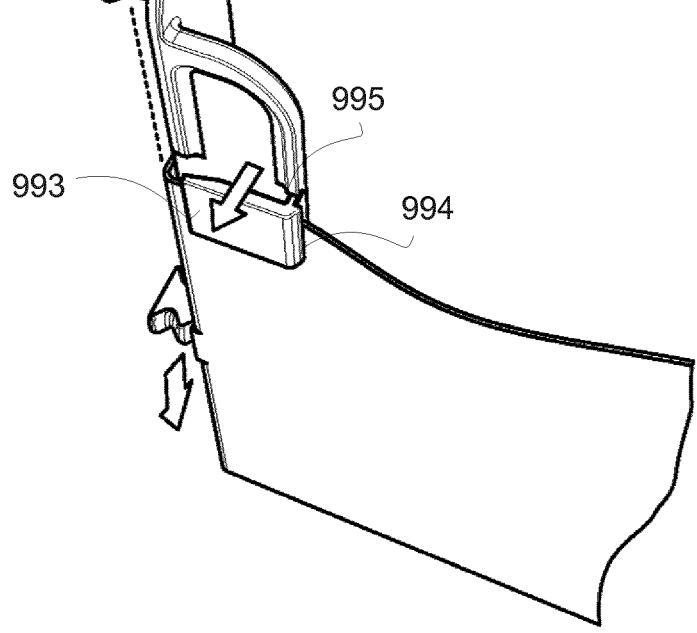

As can be seen in FIGS. 15a and 15b, the fastening device 902 comprises a locking member 992. The locking member 992 is located on the side flange 990 of the fastening device 902 on the side facing the second furniture part. In FIGS. 15a and 15b, the locking member 992 is snap actuated and comprises a cantilever portion 993, a lip portion 994 and a resilient base portion 995, wherein the base portion is positioned between the cantilever portion 993 and the a lip portion 994 thus acting as a fulcrum. However, the locking member might be a spring clip, a snap or rotation anchor or other suitable locking mechanisms for locking the fastening device to the first furniture part.

In FIG. 12, the fastening device is formed integrally as one piece. This is highly advantageous from a manufacturing pint of view, where the one piece device might be manufactured with very high throughput, good quality and with minimal use of material, using techniques such as injection moulding.

FIGS. 12 to 15 also show an example of a fastening system 1100 for joining of a first furniture part and a second furniture part, comprising the fastening device 902, a first furniture part and a second furniture part.

The first furniture part comprises a connecting slot 1101 and an L-flange 1102 perpendicular to the main plane of the first furniture part, as seen in FIG. 12. The L-flange 1102 comprises at least two holes 1103 of an oblong shape. In turn, the second furniture part comprises at least two recesses 913 of an oblong shape. The two recesses 913 each comprises one insertion opening 919 at one end and an inner end 921 at the other end. The insertion openings 919 of the recesses 913 are laterally facing towards or away from each other. As previously described, the recesses 913 comprise at least one groove 917 which co-operates with at least one ridge 915 on the dowels 911 of the fastening device 902, the at least one groove 917 and at least one ridge 915 both being in the same plane.

The arrangement of the two holes 1103 of the first furniture part corresponds to the arrangement of the at least two recesses 913 of the second furniture part. This allows the L-flange 1102 of the first furniture part to be positioned on the second furniture part, such that the at least two holes 1103 overlap the at least two recesses 913. This allows the at least two dowels 911 of the fastening device 902 to be inserted trough the at least two holes 1103 into the at least two recesses 913, when the fastening device 902 is in open configuration. This is shown in FIGS. 12 and 13.

When the inserted fastening device 902 is brought to a closed position, the fastening device 902 locks the first furniture part to the second furniture part by wedging the L-flange 1102 between the fastening device 902 and second furniture part. In the fastening system 1100, the locking member 997 of the fastening device 902 may snap into the connecting slot 1101 when the fastening device 902 reaches closed configuration, as can be seen in FIGS. 15a and 15b. This reversibly locks the fastening device 902 to the first furniture part and in closed configuration. In FIG. 15b, the locking member 997 snaps to the outside of the first furniture part, extending through the connecting slot 1101.

In FIG. 15b, a fastening system 902 guide portion 996 can also be seen. The guide portion 996 interacts with the holes 1103 in the L-flange 1102 to steer the first and second furniture parts into a correct mounted position.

Self-tightening upon mounting can also be accomplished by having the grooves 17 of the recess 13 tapered, such that such that a first groove 17 width near or substantially adjacent to the insertion opening 19 is wider than a second groove 17 width near or substantially adjacent to the inner end 21 position. This tapering results in that the dowels 11 are pulled towards the recesses 3 during sliding movement of the dowels 11 from the insertion openings 19 to the end positions 21 of the recesses 13, whereby joint furniture parts are pressed toward each other.

The elements and components of a fastening device 102 according to any of the examples above can be made of suitable furniture materials, such as wood, fibre board, plastic and/or metal.

The invention can be implemented in any suitable form of furniture, including drawers, shelves or beds. The elements and components of an example of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A fastening device for fastening to a first furniture panel and a second furniture panel, the fastening device comprises: at least two dowels for reception in oblong furniture panel recesses of the first furniture panel, each dowel is connected to a respective lateral end of lever arms of a lever and each dowel is configured to move axially and laterally, the lever arms are connected to each other at a hinge joint, wherein the dowels are displaceable in relation to each other between a furniture panel fastening position, in which the fastening device is secured to the second furniture panel, and a furniture panel releasing position, in which the fastening device is removable from the second furniture panel, wherein the dowels are displaceable in a plane defined by an extension of the first furniture panel by movement of the hinge joint in a direction perpendicular to the plane defined by the first furniture panel.

2. The fastening device according to claim 1, wherein the dowels are configured to be displaceable in relation to each other in a fastening direction, and wherein displacement of the dowels is effected by maneuvering the hinge joint in a direction being different from the fastening direction, wherein the movement of the dowels in relation to each other is linear.

3. The fastening device according to claim 1, further comprising at least one pulling ridge protruding axially from the lever, wherein the at least one pulling ridge is configured to pull the dowels axially inwards into the fastening device when the fastening device is in fastening position.

4. The fastening device according to claim 1, further comprising at least one locking ridge protruding from the lever, wherein the at least one locking ridge is arranged to rest against an inner wall of a compartment of a front part when the fastening device is in fastening position, requiring a larger initial force to move the fastening device to releasing position.

5. A fastening device for fastening a first furniture part to a second furniture part, wherein the fastening device comprises:
at least two dowels for reception in oblong recesses of the second furniture part, the dowels are each connected to a respective lever arm of a lever and each is configured to move axially and laterally,
the lever arms are connected to each other at a hinge joint, such that the dowels are displaced in relation to each other between a fastening position and a releasing position of the fastening device,
wherein when the fastening device is folded, so that the lever arms are pivoted around the hinge joint, the dowels are arranged closer to each other than when the fastening device is unfolded, and wherein when unfolded, the angle of the hinge joint is approximately 180° and the dowels are in the fastening position, and
a locking member being configured to be in an engaged position, for securely attaching the fastening device to the first furniture part, when the dowels are in the fastening position.

6. The fastening device according to claim 5, wherein the lever arms comprises a side flange extending in an axial direction of the dowels, and a support web, wherein:
the side flange is perpendicular to the support web,
the side flange and the support web extend across the hinge joint,
the at least two dowels extend from the support web, and
the support web is configured to be folded when the fastening device is in an open configuration, and is extending linearly when the fastening device is in a closed configuration, and wherein
said fastening device is formed integrally as one piece.

7. The fastening device according to claim 6, wherein the locking member is located on the side flange of the fastening device on the side facing the first furniture part, and wherein the locking member is snap actuated and comprises a cantilever portion, a lip portion and a resilient base portion, wherein the base portion is positioned between the cantilever portion and the lip portion thus acting as a fulcrum.

8. The fastening device according to claim 6, wherein at least one of the dowels comprises a guide portion at the proximal end of the dowel contacting the support web.

9. A fastening system for the joining of a first furniture part and a second furniture part for assembly of said furniture parts to each other, comprising a fastening device according to claim 5, a first furniture part and a second furniture part, wherein
the first furniture part comprises a connecting slot and an L-flange perpendicular to the main plane of the first furniture part, wherein the first furniture part comprising at least two holes, the second furniture part comprises at least two recesses of an oblong shape, the two recesses each comprises one insertion opening at one end and an inner end at the other end, the insertion openings of the recesses laterally facing towards or away from each other, the recesses comprising at least one groove which co-operates with at least one ridge on the dowels of the fastening device, where the at least one groove and the at least one ridge are both in the same plane, such that the dowels of the fastening device can be pushed into the recesses of the second furniture part when the fastening device is in a releasing position, the arrangement of the two holes of the first furniture part corresponds to the arrangement of the at least two recesses of the second furniture part, such that the L-flange of the first furniture part can be positioned on the second furniture part, such that the at least two holes overlap the at least two recesses, such that the at least two dowels of the fastening device can be inserted through the at least two holes into the at least two recesses, when the fastening device is in an open configuration, and when the inserted fastening device is brought to a closed position, the fastening device locks the first furniture part to the second furniture part by wedging the L-flange between the fastening device and second furniture part.

10. The fastening system according to claim 9, wherein the locking member of the fastening device is configured to snap into the connecting slot when it reaches closed configuration, reversibly locking the fastening device to the first furniture part and in closed configuration or wherein a guide portion is configured to interact with the holes in the first furniture part to steer the first and second furniture parts into a correct mounted position.

11. A fastening system for joining a first furniture panel and a second furniture panel for assembly of said furniture panels to each other, comprising a fastening device according to claim 1, the first furniture panel, and the second furniture panel, wherein:

the fastening device is mounted on or integrated in the first furniture panel, the second furniture panel comprises at least two recesses of an oblong shape, the two recesses each comprises one insertion opening at one end and an inner end at another end, the recesses comprising at least one groove which co-operates with at least one ridge on the dowels of the fastening device and the at least one ridge and the at least one groove are both in the same plane, such that the dowels of the fastening device can be pushed into the recesses of the second furniture panel when the fastening device is in a releasing position, and the furniture panels are joined together when the fastening device is in a fastening position, whereby the dowels are at the inner ends of the recesses, securely joining the furniture panels together.

12. A fastening system according to claim 11, wherein the at least one groove of the respective recess is tapered, such that a first groove width near or substantially adjacent to the insertion opening is wider than a second groove width near or substantially adjacent to the inner end; such that the dowels are arranged to be pulled towards the recesses during sliding movement of the dowels from the insertion openings to the inner ends of the recesses, whereby joint furniture panels are arranged to be pressed toward each other, wherein the dowels and the recesses are made of wood, fibre board, plastic and/or metal.

13. A method for using a fastening system according to claim 11, comprises the steps of:

providing the fastening system of claim 11, aligning the fastening device of the first furniture panel with corresponding recesses of the second furniture panel, inserting the dowels into the insertion openings of the corresponding recesses, switching the fastening device from said releasing position to said fastening position, whereby the dowels are slid along the recesses, allowing for cooperation between the at least one ridge of the dowels and the at least one groove of the recesses, until the dowels are at the inner ends of the recesses, whereby the furniture panels are securely joined.

14. A furniture assembly, which contains at least one fastening system according to claim 11, wherein the furniture assembly is a drawer.

\* \* \* \* \*